(12) United States Patent
Stephenson et al.

(10) Patent No.: US 6,447,172 B1
(45) Date of Patent: Sep. 10, 2002

(54) SLEEVE HOLDER FOR OPTICAL FIBER BUILDOUT

(75) Inventors: Daniel Lee Stephenson, Lilburn; Steven E. Sheldon, Norcross, both of GA (US)

(73) Assignee: Fitel USA Corp., Norcross, GA (US)

( * ) Notice: Subject to any disclaimer, the term of this patent is extended or adjusted under 35 U.S.C. 154(b) by 0 days.

(21) Appl. No.: 09/282,931

(22) Filed: Apr. 1, 1999

(51) Int. Cl.⁷ .................................................. G02B 6/38
(52) U.S. Cl. ........................................ 385/70; 385/58
(58) Field of Search .............................. 385/55, 56, 58, 385/70, 71, 136, 137, 139, 140, 52

(56) References Cited

U.S. PATENT DOCUMENTS

| | | |
|---|---|---|
| 4,738,507 A | 4/1988 | Palmquist |
| 4,738,508 A | 4/1988 | Palmquist |
| 5,082,345 A | 1/1992 | Cammons et al. |
| 5,212,752 A * | 5/1993 | Stephenson et al. .......... 385/78 |
| 5,274,729 A | 12/1993 | King et al. |
| 5,687,268 A | 11/1997 | Stephenson et al. |
| 5,838,855 A | 11/1998 | Stephenson |
| 6,126,325 A * | 10/2000 | Yamane et al. ................ 385/92 |
| 6,283,640 B1 * | 9/2001 | Stephenson et al. .......... 385/58 |
| 6,335,993 B1 * | 1/2002 | Takahashi ..................... 385/25 |

* cited by examiner

Primary Examiner—Frank G. Font
Assistant Examiner—Michael P. Mooney
(74) Attorney, Agent, or Firm—Alston & Bird LLP

(57) ABSTRACT

An improved sleeve holder for use in an optical fiber buildout is disclosed. The sleeve holder comprises an elongate tubular body formed about a longitudinal axis, the body having a first end and a spaced second end. At least a first slot is defined in the first end of the body and extends longitudinally from the first end of the body toward the second end thereof. A first annular shoulder is defined within the first end of the body about the longitudinal axis, and a second annular shoulder, spaced from the first shoulder is defined within the second end of the body about the longitudinal axis. An annular mounting flange is formed on the exterior surface of the tubular body, intermediate the ends thereof, and extends outwardly and away therefrom. The mounting flange includes at least one, and preferably a pair of radially spaced snap-fit tabs sized and shaped to be received within a buildout cap in a snap-fit for ease of installation and removal when assembling, or changing out, the components of the optical fiber buildout.

12 Claims, 23 Drawing Sheets

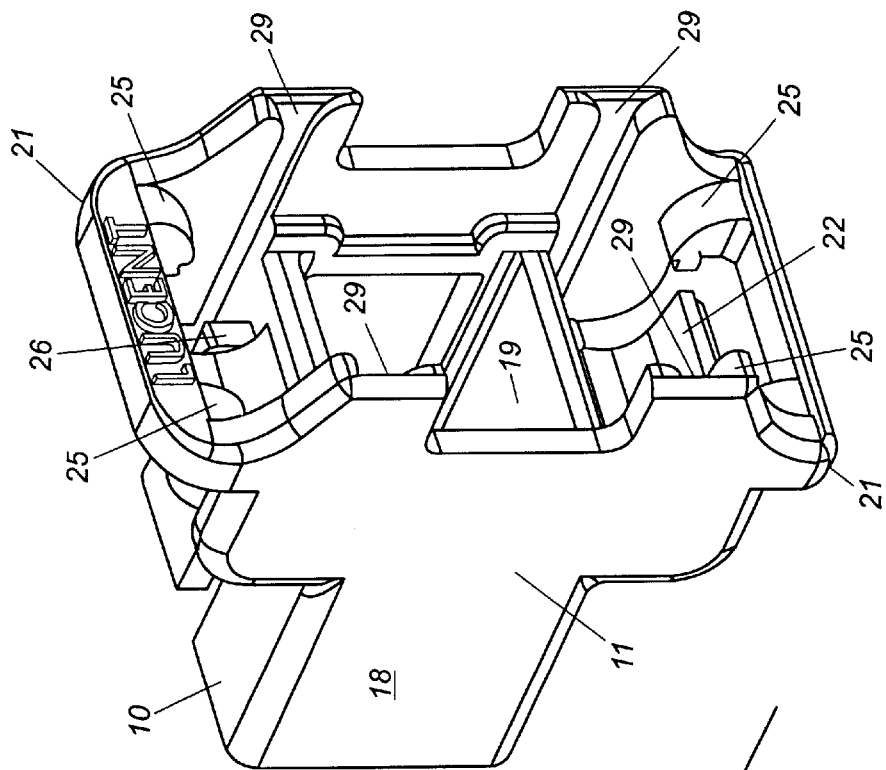
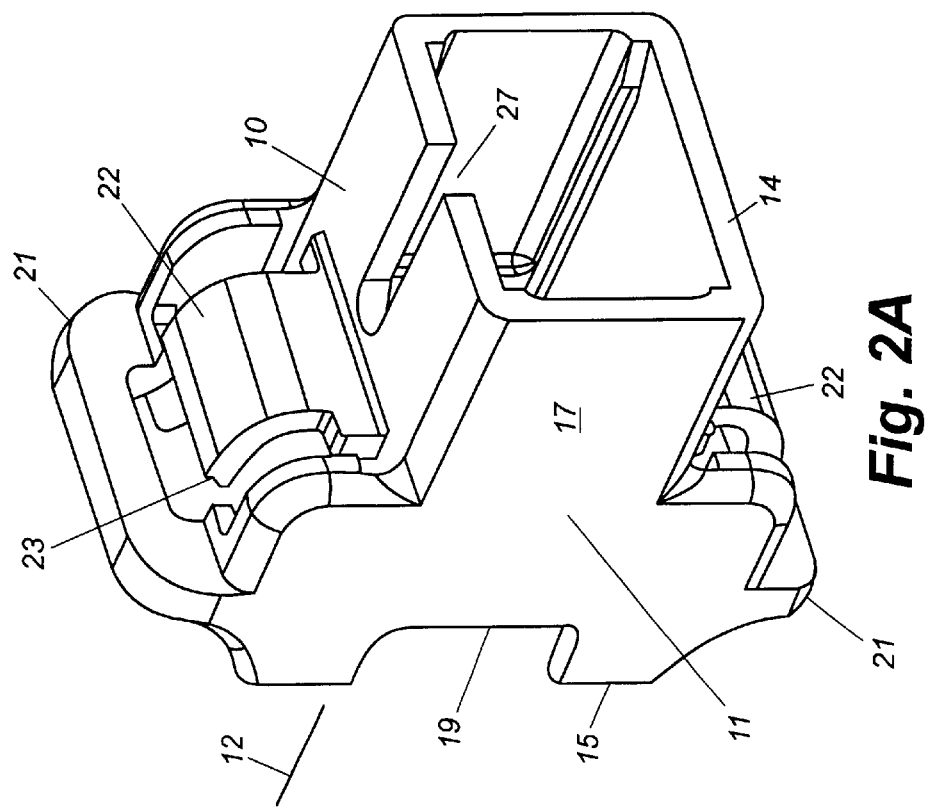

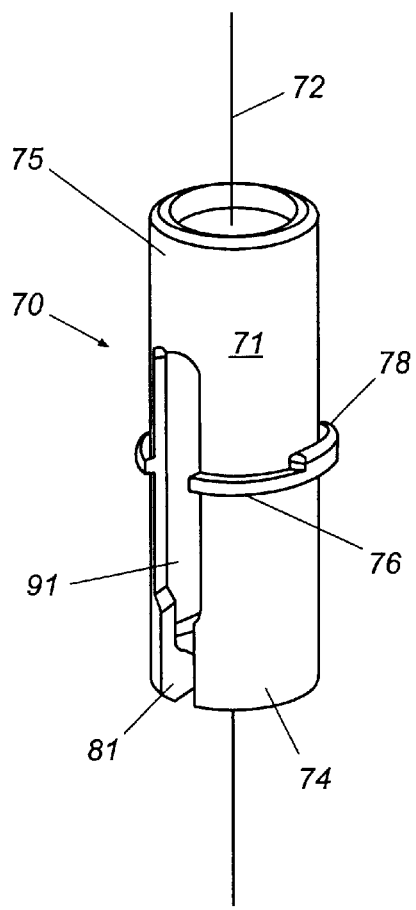
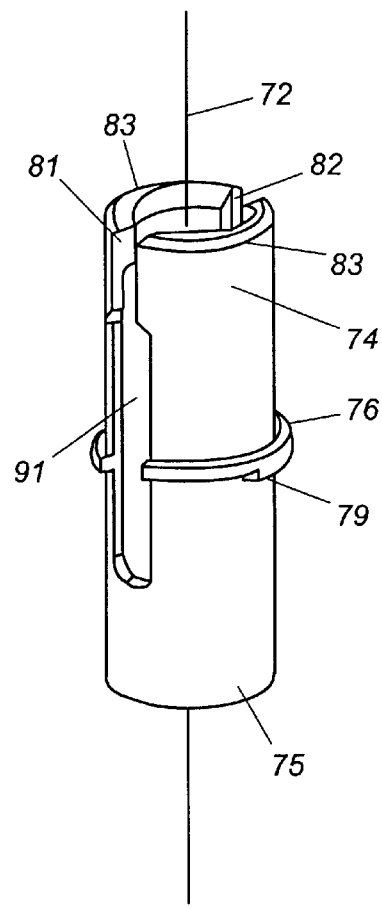
Fig. 7A
Fig. 7B
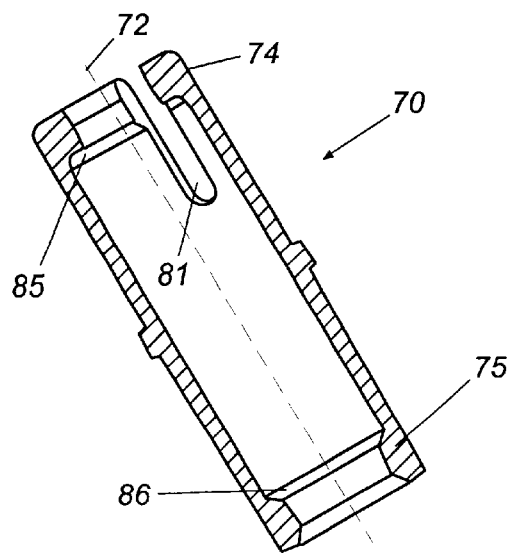
Fig. 8

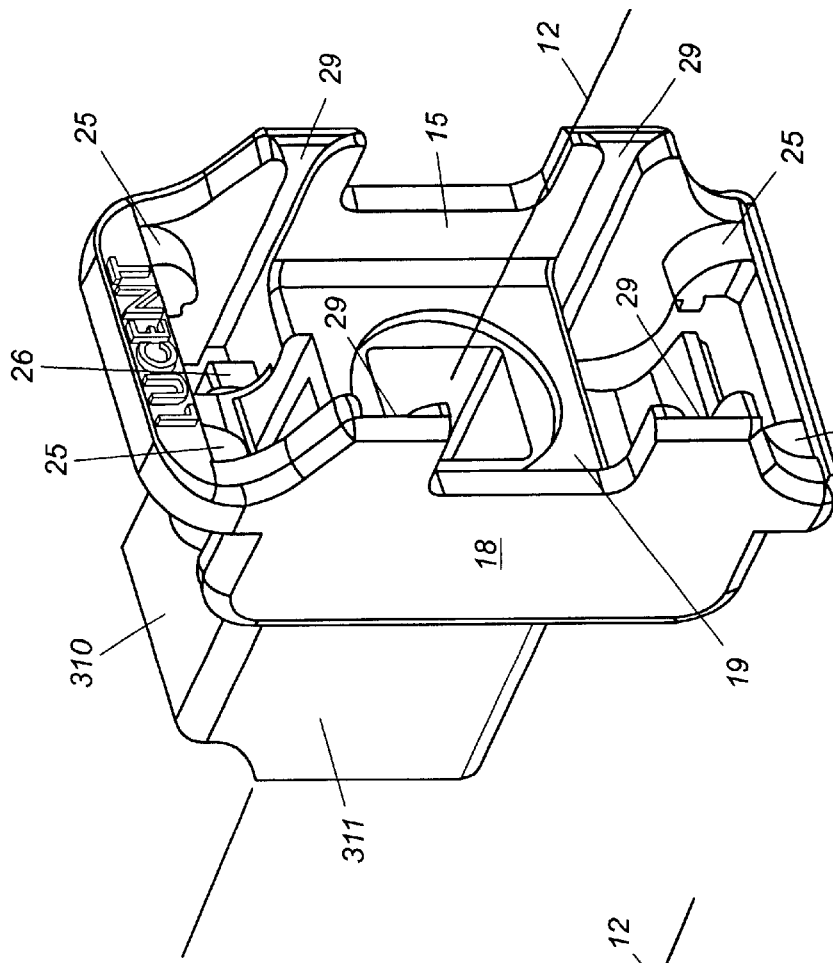
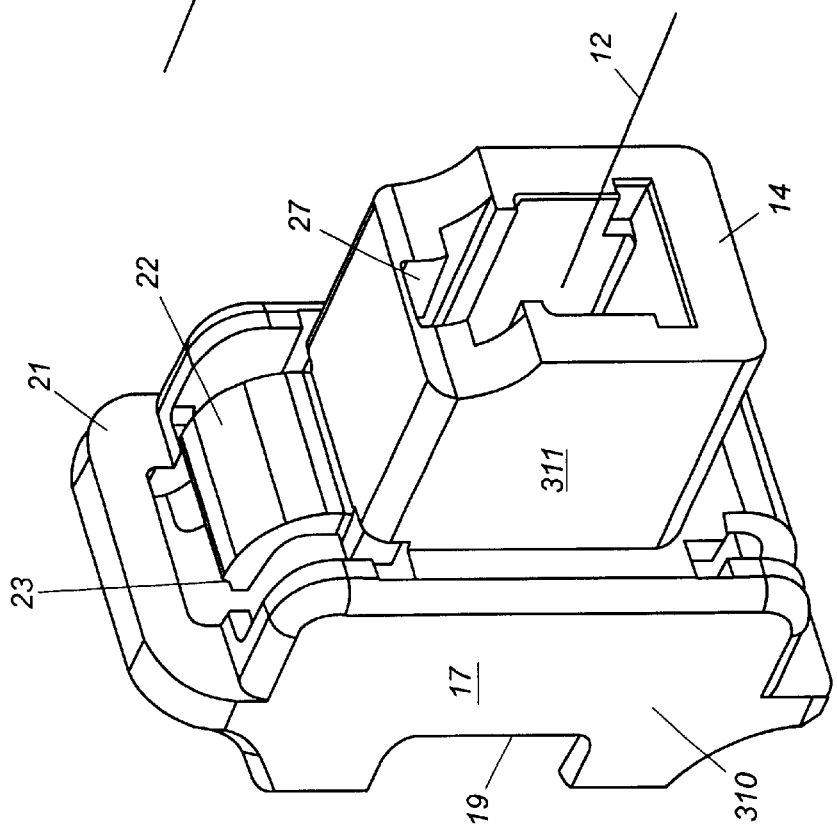
Fig. 19B
Fig. 19A

SLEEVE HOLDER FOR OPTICAL FIBER BUILDOUT

FIELD OF THE INVENTION

The present invention relates generally to an optical fiber buildout assembly for use in coupling a first optical fiber cable to a second optical fiber cable. More particularly, the invention relates to an improved sleeve holder for being received within a buildout cap of the optical fiber buildout assembly for holding an alignment sleeve therein.

BACKGROUND OF THE INVENTION

The use and construction of optical fiber cables, and optical fiber buildouts used for coupling optical fiber cables together is well known. Optical fiber cables are provided with optical fiber connectors at their ends, the optical fiber connectors being one of several known types of connectors namely being either an SC, an ST®, an FC, and/or an LC type of optical fiber connector. The SC, ST® and FC connectors are provided with 2.5 mm diameter ferrules, whereas the LC type of optical fiber connectors provide 1.25 mm diameter ferrule.

The earliest type of optical fiber couplings did not use buildouts as such, but rather they were formed as elongate adapters or connectors having a elongate bore defined along a longitudinal axis and within which an alignment sleeve would be positioned. The alignment sleeve was sized and shaped to receive, at each of its respective ends, a separate ferrule from one each of the two optical fiber connectors to be coupled. In these early optical fiber couplers, the alignment sleeve was typically passed over the end of one of the ferrules first, the ferrule bearing the sleeve then being passed into the coupler, whereupon the ferrule of the other optical fiber connector was passed into the coupler and the sleeve for completing the coupling. These alignment sleeves typically floated freely within the coupler, being held in position only by the retainer cap.

As the development of optical fiber buildouts occurred, in which a separate base and cap were used to assemble the optical fiber cable coupling, alignment sleeve holders were developed in which the alignment sleeve would be positioned such that the alignment sleeve need not first be passed into the cap and retained by a retainer cap. The problem with these types of sleeve holders, however, was that they required the use of a separate retainer cap to hold the alignment sleeve within the body of the sleeve holder, or housing. The retainer cap could become lost, or was difficult to handle in the field, which made it difficult to ensure that the retainer cap was properly secured on the sleeve holder which could result in the alignment sleeve falling out of the buildout during the buildout assembly process.

As a result, therefore, sleeve holders were developed which dispensed with the need for these retainer caps, an example of which is the sleeve holder disclosed in U.S. Pat. No. 5,838,855 to Stephenson entitled, "Sleeve Housing for Optical Coupling Buildout" assigned to Lucent Technologies, Inc, the assignee of this invention. The sleeve housing of the '855 patent to Stephenson had a cylindrical body portion, one end of which was constructed to allow the alignment sleeve to be passed therethrough and retained within the alignment sleeve holder. As a result, the sleeve housing was able to retain the alignment sleeve without the need for a separate retainer piece.

Although the sleeve housing of the '855 patent to Stephenson was a significant advance in the art, the need remains, however, for a simple alignment sleeve housing or holder which can be quickly and easily used in the field, and is sized and shaped to be snap-fit into a buildout assembly for making it easier still to assemble optical fiber buildouts. Moreover, there is a need for such an improved type of sleeve holder which can be used for the larger 2.5 mm diameter ferrules, which can also be used for holding alignment sleeves for 1.25 mm diameter ferrules such that the respective sleeve holders can be quickly and easily snapped into the buildout cap of an optical fiber buildout assembly, and for a step sleeve for a 1.25 mm to 2.5 mm that can be snap-fit into a buildout assembly.

SUMMARY OF THE INVENTION

The present invention provides an improved sleeve holder for an optical fiber buildout which overcomes some of the deficiencies of the known art. The sleeve holder of this invention provides a simple, efficient, and highly flexible device for quickly and easily assembling an optical fiber buildout in the field, and for reliably holding an alignment sleeve therein, either with or without an attenuator element within the alignment sleeve. The relative simplicity and ease of use of the improved sleeve holder of this invention provides a greater degree of reliability and ease of use, when contrasted to the known devices, when used in the assembly of an optical fiber buildout or buildout assembly.

This invention attains this high degree of flexibility and simplicity by providing an improved sleeve holder for being received within the cap of an optical fiber buildout assembly. The sleeve holder comprises an elongate tubular body formed about a longitudinal axis, the body having a first end and a spaced second end. A first slot is defined in the first end of the body, and extends longitudinally from the first end of the body toward the second end thereof. A first annular shoulder is defined within the first end of the body about the longitudinal axis, and a second annular shoulder is defined within the second end of the body about said axis, the second shoulder being spaced from the first shoulder along the axis. An annular mounting flange is formed on the exterior surface of the body intermediate the ends thereof, the flange extending outwardly of the axis and away from the body, which mounting flange is sized and shaped to be universally snap-fit into a buildout cap.

The sleeve holder may include a second slot defined in the first end of the body and spaced radially from the first slot, these two slots together defining a pair of legs within the body, the legs being constructed and arranged to be resiliently urged outwardly of the axis of the tubular body and away from one another for allowing the alignment sleeve to be passed therethrough and into the sleeve holder, whereupon the alignment sleeve will be captured therein by and between the first and second shoulders. Accordingly, the first and second shoulders are spaced a distance sufficient to capture the alignment sleeve within the tubular body of the sleeve holder.

The sleeve holder may further comprise an elongate third slot defined therein, the third slot extending substantially toward the second end of the body from one of the first and second slots, respectively, as desired. This third slot will provide access to the elongate attenuator slot formed in the alignment sleeve, and will permit the use of an attenuator with the sleeve holder and the alignment sleeve. The mounting flange of the tubular body will have at least one snap-fit tab, and preferably two radially spaced snap-fit tabs provided as a part thereof, the snap-fit tabs being sized and shaped to snap-fit within a buildout cap.

The alignment sleeve of the present invention may be used, therefore, with any one of the several differing types of buildout bases or caps, including SC, ST®, FC, and LC bases and caps, respectively. In a first embodiment the alignment sleeve holder can be used for the larger 2.5 mm ferrule optical fiber connectors comprising the ST®, SC and FC optical fiber connectors; and in a second embodiment, by sizing the diameter of the tubular body smaller, the sleeve holder of this invention may be used to couple two LC optical fiber connectors together.

It is, therefore, an object of the present invention to provide an improved sleeve holder for use in an optical fiber buildout.

It is another object of the present invention to provide an improved sleeve holder which is simple in design and construction, is rugged and durable in use, and is easy to use when assembling an optical fiber buildout assembly.

It is to these objects, as well as the other objects, features, and advantages of the present invention, which will become apparent upon reading the specification, when taken in conjunction with the accompanying drawings, to which the invention is directed.

BRIEF DESCRIPTION OF THE DRAWINGS

FIG. 2A is a rear perspective view of an SC buildout base.

FIG. 2B is a front perspective view of the SC buildout base of FIG. 2A.

FIG. 7A is a first perspective view of an alignment sleeve holder used with the buildout system.

FIG. 7B is a second perspective view of the alignment sleeve holder of FIG. 7A.

FIG. 8 is a side cross-sectional view along the longitudinal axis of the alignment sleeve holder of FIG. 7A.

FIG. 19A is a rear perspective view of an LC buildout base.

FIG. 19B is a front perspective of the LC buildout base of FIG. 19A.

DETAILED DESCRIPTION OF THE PREFERRED EMBODIMENTS

Figure 1:
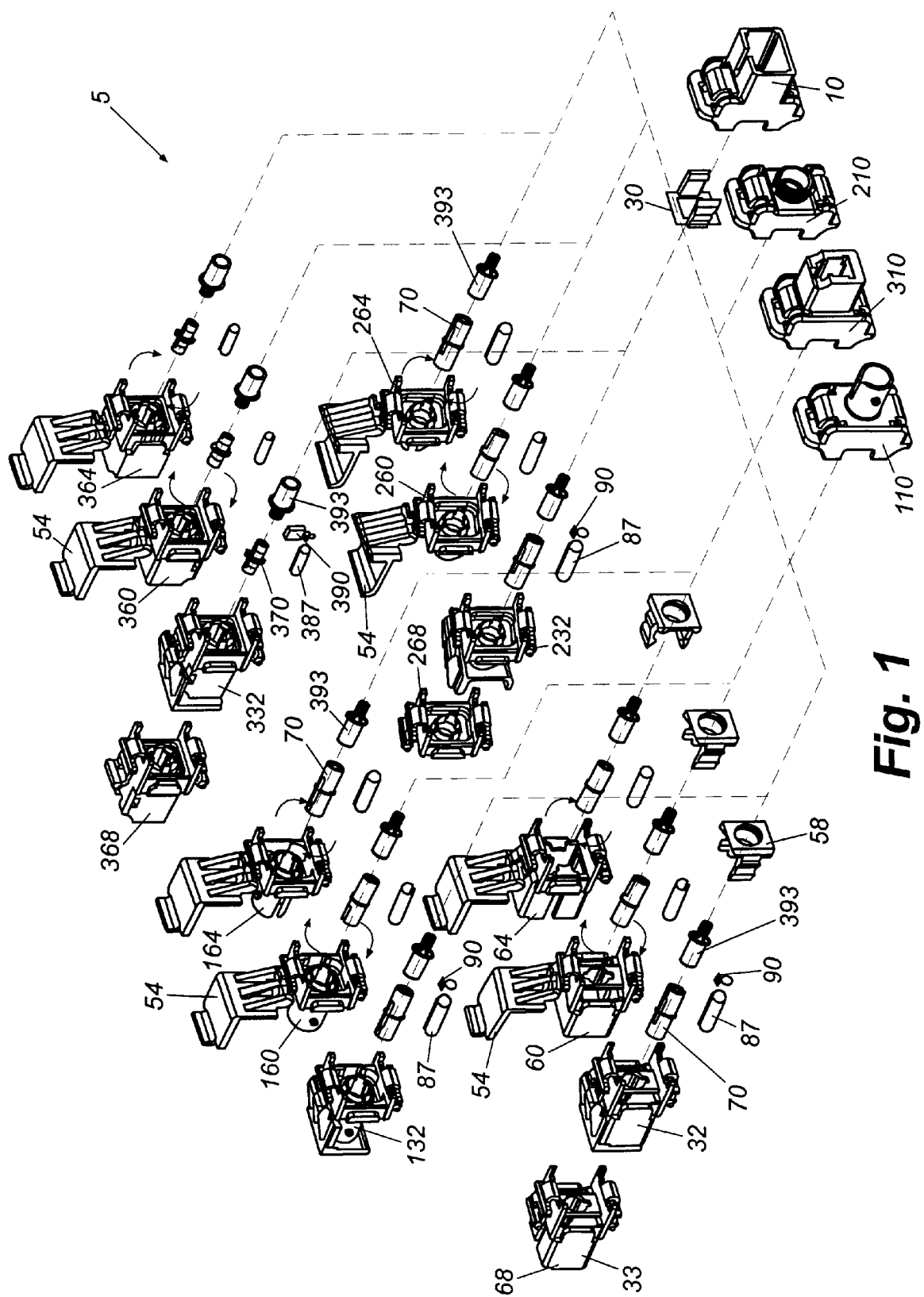
FIG. 1 is an exploded perspective view of the buildout system of this invention.

Referring now in detail to the drawings, in which like reference characters indicate like parts throughout the several views, a buildout system 5 for use in coupling a first optical fiber cable or connector to a second optical fiber cable or connector is illustrated in FIG. 1, which illustrates the several features of this invention. These features include the ability to "tune" an optical fiber buildout or buildout assembly, both of which are used interchangeably here, by selectively positioning one of the several embodiments of a buildout cap within a buildout base in any one of a plurality of rotational positions about the longitudinal axis of the buildout base. This makes it possible to selectively optimize, and/or attenuate, as desired, an optical signal passed through either one of the first or the second optical fiber cables and connectors (not illustrated), respectively, received at either the base or the cap of the buildout, in response to selectively positioning the cap within any one of four rotational positions about the axis of the base.

Another feature of buildout system 5, as shown in FIG. 1, and as described in greater detail below, are the two new embodiments of a snap-fit alignment sleeve holder 70 and 370 respectively, for use in SC, ST®, and FC optical fiber connectors, and LC optical fiber connectors, respectively. The new embodiments of the alignment sleeve holder, although specifically sized for either a 2.5 mm optical fiber connector ferrule, or 1.25 mm optical fiber connector ferrule, respectively, are constructed similarly in that an elongate tubular body is provided with an annular mounting flange for being quickly and easily snap-fit within the appropriate buildout cap. Yet another feature of the present buildout system is a new universal modular buildout system such that, for the first time, it is now possible to couple any known type of optical fiber buildout base to any known type of optical fiber buildout cap. More particularly, the buildout system 5 of this invention permits for the first time any one of an SC, ST®, or FC buildout base or cap, respectively, to be selectively mated to an LC cap or base, respectively.

An additional feature of this invention is the provision of a universally sized and shaped buildout base such that it can be received within a single pre-defined sized and shaped opening formed within a mounting panel, there being any one of a plurality of such openings provided in the panel, as desired, in a snap-fit without regard to whether the base is an SC base, an ST® base, an FC base, and/or an LC base.

Turning first to FIGS. 2A and 2B, a preferred embodiment of an SC buildout base 10 is illustrated. The buildout base is comprised of an elongate tubular body 11 formed about a longitudinal axis 12, the tubular body being sized and shaped to accept the known type of an SC optical fiber connector (not illustrated) thereat. As such, the body has a first end 14 and a spaced second end 15. Extending between the first and second ends of the body is a first side 17, and an opposed, spaced and parallel second side 18. Defined within each of the first and second sides, respectively, is a recess or cut-out 19 adapted for receiving a matching key 41 (FIGS. 3A, 3B) formed in each one of the several embodiments of the buildout caps illustrated in FIG. 1 for properly aligning the buildout cap with its respective buildout base.

Figure 6:
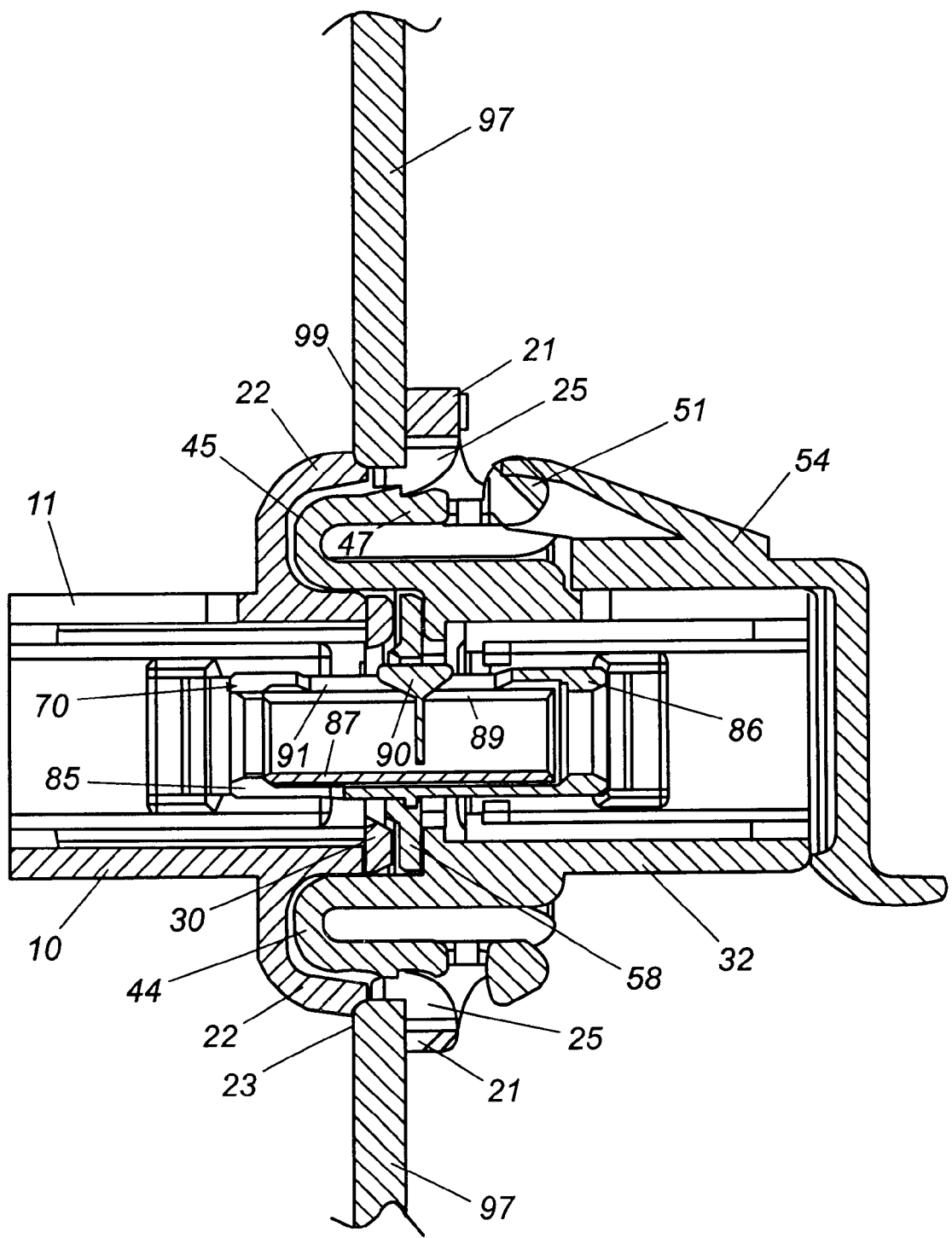
FIG. 6 is a side cross-sectional view along the longitudinal axis of an assembled SC buildout assembly showing the assembled buildout received within a mounting panel in a snap-fit.

Formed between the first and second ends of the tubular body, in this instance positioned approximate the second end 15 of the tubular body 11, is a pair of spaced and opposed first mounting flanges 21, each of which extends outwardly and away from the body 11. Also provided as a part of the body is a pair of spaced and opposed second mounting flanges 22, with a respective one of the mounting flanges 22 being spaced from and opposed to one each of the first flanges 21 for receiving the mounting panel 97, as illustrated in FIG. 6, therebetween in a snap-fit. Each of second mounting flanges 22, accordingly, is constructed to be resilient such that it can be urged inwardly toward the body and/or the longitudinal axis of the body as the first end 14 of the tubular body is passed through an opening 98 (FIG. 6) defined within the mounting panel 97, until such time that the respective second mounting flanges have passed through the opening, whereupon they will be biased outwardly into their normal extended and/or locking position. Once the second flanges are passed through the panel opening, an elongate continuous notch 23, as shown in FIGS. 2A and 6, is received against an edge 99 of the opening 98 within the mounting panel. So constructed, the buildout base is received within the mounting panel 97 in a snap-fit. The buildout base can be removed by pressing both of flanges 22 inwardly, and then pushing the first end of the buildout base through the opening in the mounting panel, and withdrawing the base from the mounting panel.

A feature of this construction, however, is that, and as best shown in FIG. 1 and as described in greater detail below, each one of the several respective buildout bases of this system, for example the SC buildout base 10, the ST® buildout base 110, the FC buildout base 210, and/or the LC buildout base 310, are each constructed to be identically sized and shaped such that each respective base has a pair of first mounting flanges 21 and a pair of second and opposed mounting flanges 22. This permits any one of the buildout bases to be received within the same size of the opening 98 defined in the mounting panel 97. This simplifies the construction of the mounting panel in that separately sized and shaped openings need not be provided for the several types of buildout bases which can be provided, as has been the case previously. For example, as seen in U.S. Pat. No. 5,274,729 to King et al., assigned to AT&T Bell Laboratories, the predecessor in interest to the assignee of this invention, a mounting panel is shown having several differently sized and shaped openings defined therein for receiving any one of the three respective buildout bases of that patent within the mounting panel. This unnecessarily complicates the construction of the mounting panel, and does not allow for the flexibility and ease of installation that the present buildout system provides.

Still referring to FIGS. 2A and 2B, and as best shown in FIG. 2B, four spaced locking tabs 25 are provided, with one pair of tabs 25 being formed on each one of first flanges 21. These locking tabs 25 are provided for receiving and interlocking with a corresponding locking tab 47, as will be described below, formed as a part of a buildout cap that will be snap-fit to the second end 15 of the buildout base. Moreover, and as shown and described in greater detail below, as each one of the bases is similarly constructed, this construction allows for any buildout base to receive any one of the different types of known buildout caps therein.

A position alignment key 26, best thought of as the rotational home position alignment key, is shown in FIG. 2B. The key 26 is formed as a part of the tubular body 11 of the buildout base. As will be described in greater detail below, this serves as the home position reference point so that when a selected buildout cap is to be snap-fit to the buildout base, and if it is desired to "tune" the optical fiber coupling by positioning the buildout cap in any one a number of rotational positions about the longitudinal axis 12 of the base, this is done with respect to the position alignment key 26.

The buildout base 10 also includes, in known fashion, an elongate slotted opening 27 provided as a keyway or alignment guide for the optical fiber connector (not illustrated) that will be received therein. The construction of the several differing types of optical fiber connectors that can be received within the different bases and caps of the buildout system of this invention are not illustrated or described in greater detail herein as they are well known to those skilled in the art. Applicants incorporate by reference, therefore, the provisions of U.S. Pat. No. 5,274,729 to King et al., which illustrates the construction of the known type of SC, ST®, and FC optical fiber connectors, and Applicants also incorporate herein by reference the provisions of U.S. patent application Ser. No. 09/148,348 now U.S. Pat. No. 6,220,763 entitled "Optical Fiber Buildout System", filed in the United States Patent and Trademark Office on Sep. 4, 1998, which patent application illustrates the construction of the known types of LC optical fiber connectors. As known, therefore, each one of these respective types of optical fiber connectors will have a connector grip, the grip having an alignment key sized and shaped for being received within its appropriately shaped keyway slot 27, as described.

The buildout base 10 also includes four separate elongate guide slots 29 formed therein and as a part thereof, the four guide slots being formed at the four opposed corners of the tubular body 11 of the base, at the second end 15 thereof. Each one of these guide slots is sized and shaped to receive a respective one of the four cap guides 56 (FIGS. 3A–5) of the several embodiments of the SC buildout cap, for example, as well as any one of the other embodiments of the ST®, FC and LC buildout caps, as illustrated in the buildout system 5. For the SC base 10 shown in FIGS. 2A and 2B, and in known fashion, a snap-fit SC base latch 30 is provided for being received within the second end of the base, the base latch being sized and shaped to receive an SC optical fiber connector therein in known fashion.

Figure 3B:
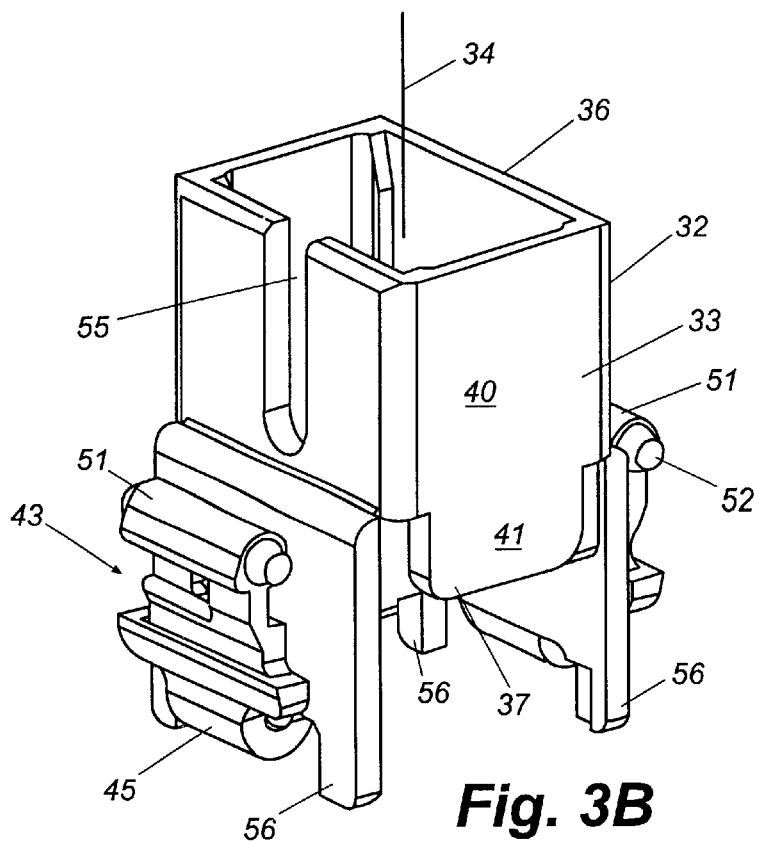
FIG. 3B is a front perspective view of the SC buildout cap of FIG. 3A.
Figure 3A:
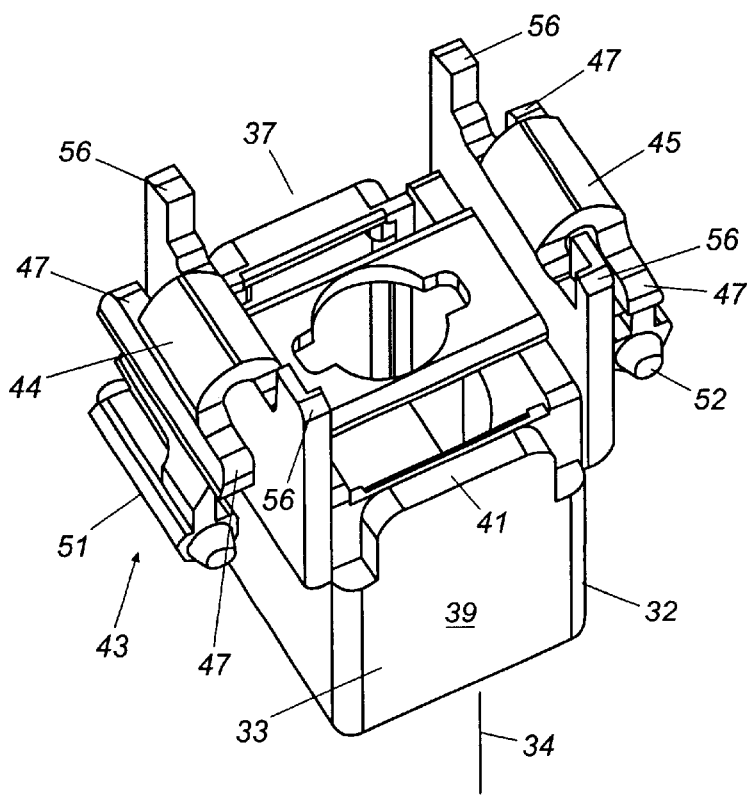
FIG. 3A is a bottom perspective view of a standard SC buildout cap.

A first embodiment of an SC buildout cap is illustrated in FIGS. 3A and 3B. This embodiment of the buildout cap is a "standard" cap, intended for use in a straight or a North-North coupling to the SC buildout base 10, or any one of the other buildout bases 110, 210, 310, as described. As known to those of skill in the art, a "North-North" coupling occurs when the two parts of a buildout are coupled to one another with a top edge, surface, or side of a buildout cap, for example, mated to the top edge or side of it's respective buildout cap. The buildout cap 32 comprises an elongate tubular body 33 formed about a longitudinal axis 34 having a first end 36 and a spaced second end 37. In fashion similar to the construction of the buildout base, the buildout cap has a first side 39 and a spaced, opposed and parallel second side 40 extending between the first and second ends of the body. Here, however, each of the first and second sides 39, 40, respectively, has an alignment key 41 or tab provided as a part thereof, which key is sized and shaped to be received within a respective one of the recesses 19 formed in the buildout base in any one of its several embodiments in this system.

Buildout cap 32 includes a cap latching arrangement 43 for securing the cap to a respective one of any of the differing types of buildout bases of the system. The cap latching arrangement is comprised of a first resilient flange 44 and a second spaced and opposed resilient flange 45. A pair of locking tabs 47 are formed on each one of the flanges 44, 45, each one of the locking tabs 47 being sized and shaped to be received within an interlocking snap-fit relationship with a respective one of the locking tabs 25 (FIG. 2B) of the buildout base. The manner in which the locking tabs 47 of the cap latching arrangement are interlocked with the locking tabs 25 of the buildout base is shown in FIG. 6, which shows a locking tab 47 in an interlocked snapfit with the respective one of the locking tabs 25.

The buildout cap is releasably fastened or locked to the buildout base by passing the second end 37 of the buildout cap into the second end 15 of the buildout base, the base being sized and shaped to receive both of the resilient flanges 44, 45, therein. As the flanges 44 and 45 are passed within the second end of the base, the locking tabs 47 of the respective flanges will engage the locking tabs 25 of the base, the locking tabs 25 of the base being curved to guide the locking tabs 47 and the flanges into the base. As this occurs the locking tabs also urge the flanges 44 and 45 inwardly toward the longitudinal axis of the cap until such time as the locking tabs 47 pass over the locking tabs 25, at which point the resilient nature of the flanges 44, 45, will urge the tabs 47 into a snap-fit with the tabs 25, the cap now being locked to the base in a snap-fit.

The flanges 44 and 45 are capable of being grasped by a respective finger grip 51 formed at the end of each flange. The finger grip may be used not only to hold the cap while passing the second end thereof into the buildout base, but may also be used to compress the flanges 44, 45 toward the longitudinal axis of the cap for assisting in the placement of the cap within the base, and in particular for moving the locking tabs 47 into a snap-fit with the locking tabs 25 of the base. When it is desired to release the cap from the base, the finger grips 51 are grasped and moved, i.e. squeezed, toward one another, whereupon the cap may be withdrawn from the base by drawing locking tabs 47 back over their respective locking tabs 25, and then withdrawing the cap from the base.

A pair of spaced and opposed dust cover pivots 52 are formed as an integral part of each finger grip 51. Accordingly, and as shown in FIGS. 1 and 6, a dust cover 54, of the type disclosed in U.S. Pat. No. 5,687,268 to Stephenson, et al., issued Nov. 11, 1997 entitled, Pivotable Optical Shutter for Block Emission From A Light Guide Adapter No. 5, the provisions of which are incorporated herein by this reference, as well as in U.S. patent application Ser. No. 08/857,402 filed May 16, 1997 entitled Optical Fiber Coupling Buildout System, and Ser. No. 08/988,520 filed Dec. 10, 1997, entitled Universal Dust Cover, the provisions of which are also incorporated herein by this reference, is provided for the cap. The dust cover is snap-fit onto a pair of the dust cover pivots on a respective one of the flanges 44, 45, and is selectively movable from an open position to a closed position shielding the first end of the buildout cap.

As shown in FIGS. 3A–5, the buildout cap 32 includes four spaced and elongate cap guides 56 which each extend coaxially about the longitudinal axis 34 of the cap, and extend away from the second end 37 thereof. Each one of the cap guides 56 is sized and shaped to be received within a respective one of the guide slots 29 formed in the buildout base 10. The cap guides 56 are provided for the purposes of guiding the cap into the base when the cap and base are being assembled together in a snap-fit, and are also provided for the purposes of adding angular or rotational rigidity to the buildout about the longitudinal axis so that the assembled buildout will not tend to twist apart in use. Moreover, due to the unique construction of this buildout system, which allows for the buildout cap to be placed in any one of the plurality of rotational positions about the longitudinal axis of the base, as described in greater detail below, each the cap guides will still be received within its respective guide slot to rigidify the assembled buildout. The cap guides 56 are also provided so that when the cap is received within its respective base, the cap being provided with an alignment sleeve holder snap-fit therein to which an optical fiber connector will be affixed, the buildout cap will be moved toward the base along the longitudinal axis of the base rather than coming in at an angle which could potentially damage either the optical fiber connector, for example its ferrule, or, more importantly damage the optical fiber end exposed at the end of the ferrule.

Lastly, with regard to SC buildout cap 32, in all its embodiments, and as shown in FIG. 1, an SC cap latch 58 is provided for being snap-fit into the cap, the cap latch being sized and shaped to receive an SC optical fiber connector (not illustrated) therein in a known type of snap-fit.

Figure 4:
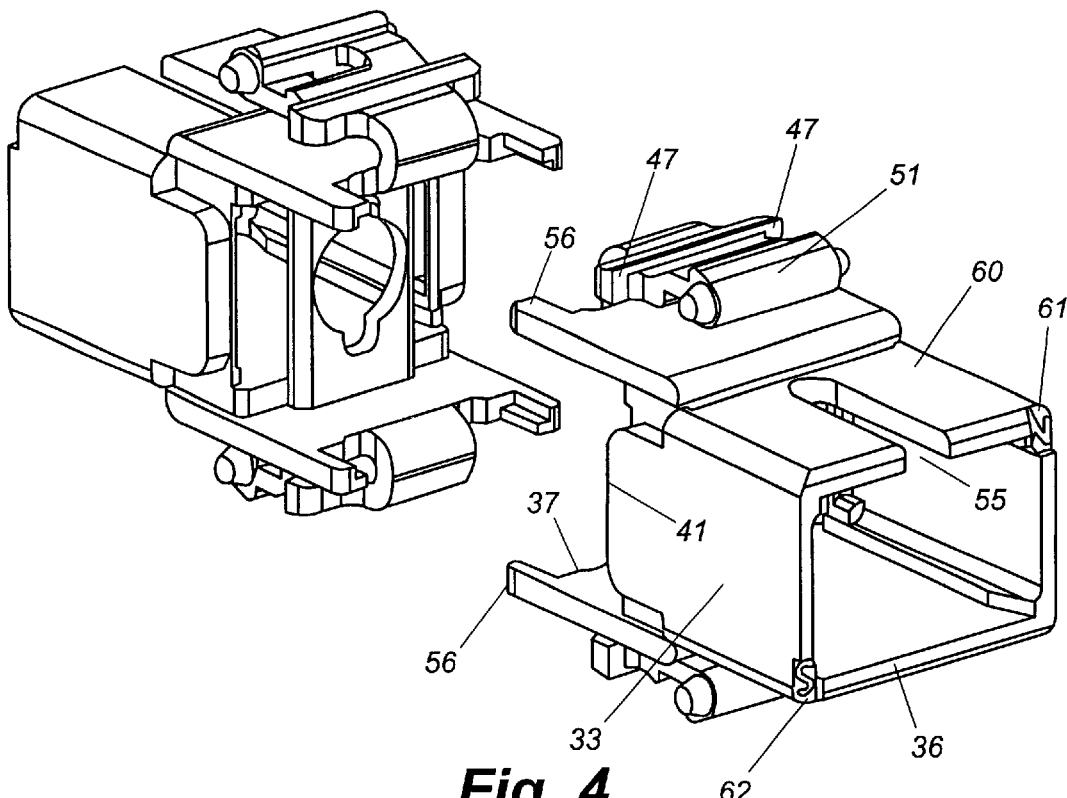
FIG. 4 is a rear perspective view of a second embodiment of an SC buildout cap.
Figure 5:
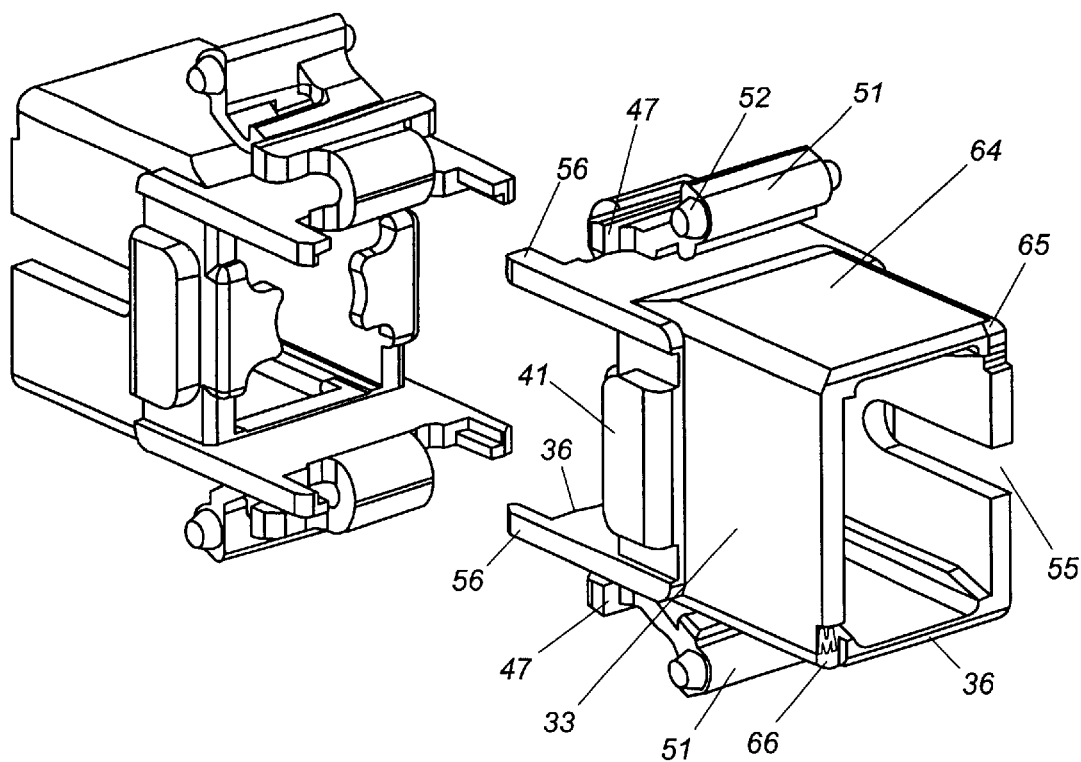
FIG. 5 is a rear perspective view of a third embodiment of an SC buildout cap.

FIGS. 4 and 5 illustrate a second embodiment and a third embodiment, respectively, of the SC buildout cap of buildout system 5. FIG. 4 illustrates an SC North-South buildout cap 60 which is constructed in fashion identical to buildout cap 32, with the exception that cap 60 includes a first or "North" rotational position orientation marking 61 and a diametrically opposed second or "South" rotational position orientation marking 62. Unlike the standard SC buildout cap 32 illustrated in FIGS. 3A and 3B, which is intended to be assembled to a buildout base in a standard or North-North coupling, the SC buildout cap 60 shown in FIG. 4 is constructed to be selectively received within one of two positions in the SC buildout base 10, or any other buildout base of system 5, namely in a North-North position, as shown in FIG. 4, or a North-South position in which the South position marker 62 is positioned at and with respect to the position alignment key 26 on the buildout base 10 such that the cap has been rotated 180° from the North-North coupling position.

Similarly, the SC East-West buildout cap 64 shown in FIG. 5 is constructed in a fashion mostly identical to buildout the standard SC buildout cap 32, with the exception that its tubular body and keyway 55 are rotated 90° about the cap axis 34, and it has a first or "East" rotational position orientation marking 65, and a diametrically opposed second or "West" rotational position orientation marking 66. So constructed, buildout cap 64 can be received within SC buildout base 10, or within any one of the bases of the buildout system, to include ST® buildout base 110, FC buildout base 210, and LC buildout base 310, such that the optical fiber connector keyway slot 55 is positioned 90°, or 270° from the position alignment key 26 formed on the buildout base.

The reason for providing buildout caps 60 and 64 is that by selectively positioning these buildout caps within the second end of the buildout base, the buildout cap, and thus the optical fiber connector and the optical fiber, is rotationally positioned about the longitudinal axis 12 of the buildout base. As known to those of skill in the art, and as discussed in U.S. Pat. Nos. 4,738,507, and 4,738,508 to Palmquist and assigned to AT&T Technologies, Inc., a predecessor in interests to the assignee of this invention, when assembling optical fiber connectors once the optical fiber at the terminated end of the optical fiber cable has been placed within an optical fiber connector ferrule, an eccentricity oftentimes exists with respect to and from the longitudinal axis of the ferrule such that if this eccentricity is not found and marked, when two optical fiber connectors are brought together in a buildout an unintended signal loss due to a slight misalignment of the terminated optical fibers may result.

To combat this problem, Palmquist teaches a method of determining in which one of the four quadrants of a 360° circle formed about the longitudinal axis of the ferrule the optical fiber is found more so that the other three quadrants, whereupon the optical fiber connector is assembled with the eccentricity keyed to a standard "North" key. In known fashion, therefore, the standard North-North connections are made such that the eccentricity of the two terminated optical fibers will lie in the same quadrant, thus tending to minimize, to the greatest extent possible, the loss in the optical signal passed through the optical fiber connectors.

The method of Palmquist, however, requires that this determination of the eccentricity, and the marking of same, take place in a controlled environment, and which method is not well suited for being performed in the field. Moreover, once a standard North-North connection has been made, in order to attenuate the strength of the optical signal passed through the optical fibers, when and as desired, it is necessary to position an attenuator element in the alignment sleeve into which the connector ferrules will have been passed, between the opposed ferrules, as described in U.S. Pat. No. 5,838,855 to Stephenson, the provisions of which are incorporated herein fully by this reference.

By providing three different caps as a part of the buildout system, a standard or North cap 32, a North-South cap 60, and an East-West cap 64, it is now possible to use these optical fiber/ferrule eccentricities to selectively optimize the strength of a signal passed through the optical fibers by positioning the cap within one of the four rotational positions spaced radially and 90° apart about the longitudinal axis 12 of the buildout base, referred to as being the North, South, East, and West positions, respectively. Thus, rather than having to use an attenuator element to reduce signal strength, it is now possible that the buildout cap can be removed and replaced with a cap constructed and arranged to be rotationally positioned about the longitudinal axis of the buildout base such that the eccentricity within the optical fiber cables and/or ferrules is used to tune, i.e. selectively optimize or attenuate, as desired, the strength of an optical signal passed therethrough. As each of the caps is constructed in identical fashion to include, for example, four cap guides 56 for being received within the guide slots 29 of the buildout base, a universal and tunable buildout system has been attained.

Now, for example, when it is desired to reduce signal strength, rather than trying to place a relatively small attenuator element, such as that disclosed in the '855 patent to Stephenson, within the alignment sleeve, all that is needed is to unplug the optical fiber connector from the cap, remove the cap from the base, select a new cap, either an East/West or North/South cap, and then plug the cap into the base such that the optical fiber connector is in a new rotational position with respect to the base, measure the signal strength, and determine if a satisfactory signal strength is attained.

A fourth SC cap, identified as a high attenuation cap 68 is illustrated in FIG. 1. If levels of attenuation of from 17 decibels to 23 decibels are required, the high attenuation style cap will be used. This is due to the fact that in order to accommodate an attenuator of sufficient thickness to attain these levels of attenuation, it is necessary to lengthen the body of the cap so that sufficient space exists between the ends of the optical fiber connectors, all those except the ST® connectors which have enough play due to spring travel and the manner in which they are assembled, to permit the optical fiber connectors to be coupled to a buildout base and buildout cap that will not otherwise force the terminated ends of the optical fibers and ferrules against the attenuator element with the possibility of damaging the optical fiber ends. The high attenuation cap 68 is constructed as a standard cap 32, with the exception that the body portion 33 thereof is elongated along the longitudinal axis of the cap such that a greater distance exists between the first end 36 and the second end 37. Otherwise the cap is constructed in fashion identical to the standard North/North SC cap 32.

As discussed above, FIG. 6 illustrates an assembled or coupled SC buildout in which an SC buildout base 10 is coupled to a standard SC buildout cap 32. FIG. 6, in conjunction with FIGS. 7A–8, also illustrates a first embodiment of the new alignment sleeve holder 70 of this invention. Referring now to FIGS. 7A–8, an alignment sleeve holder 70 is shown which has an elongate tubular body 71 formed about a longitudinal axis 72. The tubular body has a first end 74 and a spaced second end 75. Formed on the outside surface of the body, intermediate the first and second ends thereof, and projecting outwardly and away from the body is an annular mounting flange 76. The annular mounting flange includes a first snap-fit tab 78 formed thereon, and a radially spaced second snap-fit tab 79. Both of these snap-fit tabs are sized and shaped such that they can be received with an opening defined by the sleeve holder latching mechanism 93 of the system, as best illustrated in FIG. 10A, for example, and which is described in greater detail below.

The alignment sleeve holder 70 has a first slot 81 formed at its first end, the slot extending partially toward the second end of the body. Radially spaced from the first slot is a second slot 82, which is also defined in the first end of the tubular body, and extends partially toward the second end of the body as well. The first and second slots, respectively, form a pair of spaced and resilient legs 83 at the first end of the tubular body 71 of the alignment sleeve holder. As the alignment sleeve holder will be constructed of a resilient material, preferably polysulfone or polyetherimide, the legs are capable of being urged outwardly as an alignment sleeve 87 (FIG. 6) is passed therethrough for being received within the tubular body about longitudinal axis 72. The alignment sleeve 87 is received against a first annular shoulder 85 defined within the first end of the tubular body and a second annular shoulder 86 formed at the second end of the tubular body. The two shoulders 85, 86 are spaced apart a distance sufficient for capturing the alignment sleeve 87 therebetween in a snap-fit.

In known fashion, the alignment sleeve 87 has an elongate attenuator slot 89 defined therein, which slot typically extends the length of the alignment sleeve. An attenuator element 90 may be positioned within the attenuator slot, as shown in FIG. 6, between the ends of the ferrules (not illustrated) of the optical fiber connectors (not illustrated) that will be received at the first end of the buildout base and the buildout cap, respectively, for coupling the two optical fibers to one another. Accordingly, in order to accommodate the introduction of the attenuator element 90 into slot 89 of the alignment sleeve, an elongate third slot 91 is defined within the tubular body 71, and extends substantially toward the second end of the body. The slot 91 can extend from either one of the first or second slots 81 or 82, as desired, although it is shown for illustration purposes, only, in FIGS. 7A and 7B as extending from first slot 81.

The alignment sleeve holder 70 will be received within the buildout cap in a snap-fit. This is accomplished by a sleeve holder latching mechanism 93 provided as a part of the buildout cap. The sleeve holder latching mechanism 93 need not be provided as a part of any one of the several SC caps, however, as the SC cap latch 58 is constructed and arranged to capture the flange 76 of the sleeve holder therein in a snap-fit. The sleeve holder latching mechanism 93 is, however, formed as a part of the other caps in the buildout system 5, namely the ST® caps, the FC caps, and the LC caps.

The sleeve holder latching mechanism 93 is illustrated in FIG. 10A for a standard ST® cap 132. The ST® cap 132 is constructed in all other aspects identically to the SC cap 32, with the exception that the tubular body 133 of the ST® cap is formed for connection to an ST® optical fiber connector, as opposed to an SC optical fiber connector. The cap latching mechanism 93 includes a base portion 94 formed for receiving the mounting flange 76 of the alignment sleeve holder thereon, with at least one resilient latching arm 95, and in this instance three radially spaced resilient latching arms 95, sized and shaped to allow the mounting flange to be passed thereover, which thus urges the latching arm(s) outwardly of the longitudinal axis 34 of the cap, until such time as the mounting flange passes thereover and is received on the base 94, whereupon the latching arm(s) will resiliently return to its/their normal position about the longitudinal axis of the cap and will lock the mounting flange of the sleeve holder to the cap in a snap-fit.

Figure 9B:
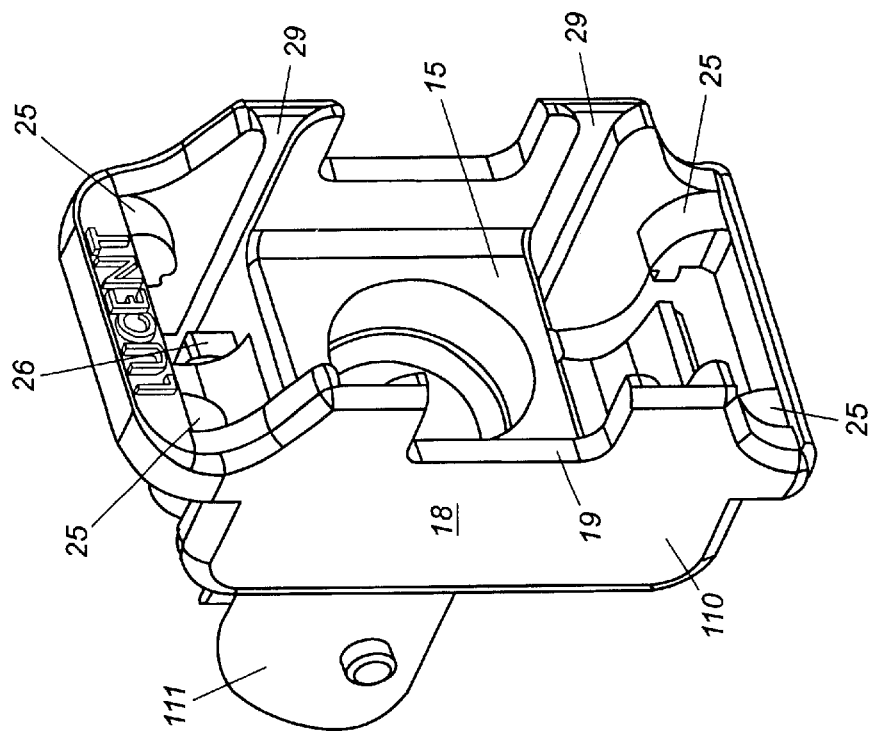
FIG. 9B is a front perspective view of the ST® buildout base of FIG. 9A.
Figure 9A:
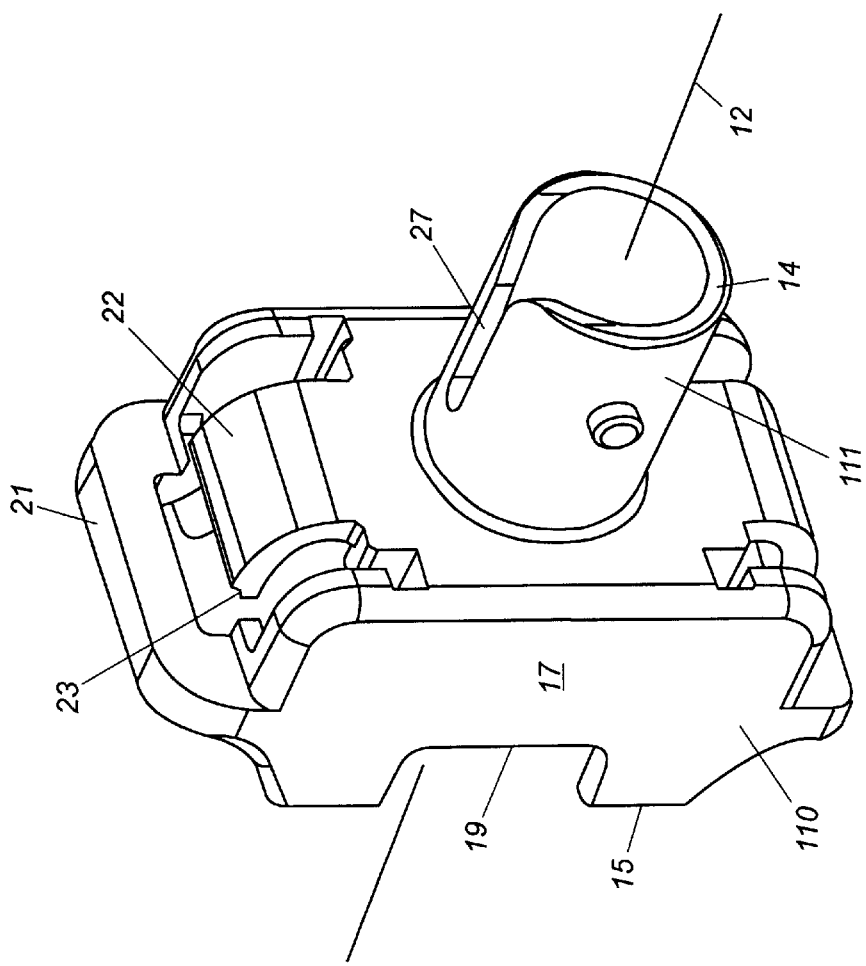
FIG. 9A is a rear perspective view of an ST® buildout base.

As described above, as buildout system 5 is universal in its construction and application in that any one of the plurality of the different types of buildout caps can be received within any one of the plurality of the different types of buildout bases, we refer now to FIGS. 9A and 9B which illustrate an ST® buildout base 110. Buildout base 110 is constructed in fashion mostly identical to the SC base 10 described in greater detail above, with the exception that the tubular body 111 of ST® base 110 is formed for connection to an ST® optical fiber connector (not illustrated) as known, and is not provided with an SC base latch. Accordingly, buildout base 110 includes a first end 14, a spaced second end 15, a pair of opposed sides 17 and 18, and a recess 19 defined within each one of the sides for receiving the alignment key 41 of any one of the buildout caps therein.

Still referring to FIGS. 9A and 9B, the ST® buildout base 110 also includes the first and second mounting flanges 21 and 22, respectively, with the notch 23 defined in the second flange, the locking tabs 25 for engagement with the locking tabs 47 of the cap latching arrangement 43, the position alignment key 26, and the optical fiber connector keyway 27. Lastly, the ST® base will also include four spaced guide slots 29, formed at the second end of the base for receiving the cap guides 56 of any one of the different types, and embodiments thereof, of buildout caps therein.

Figure 10B:
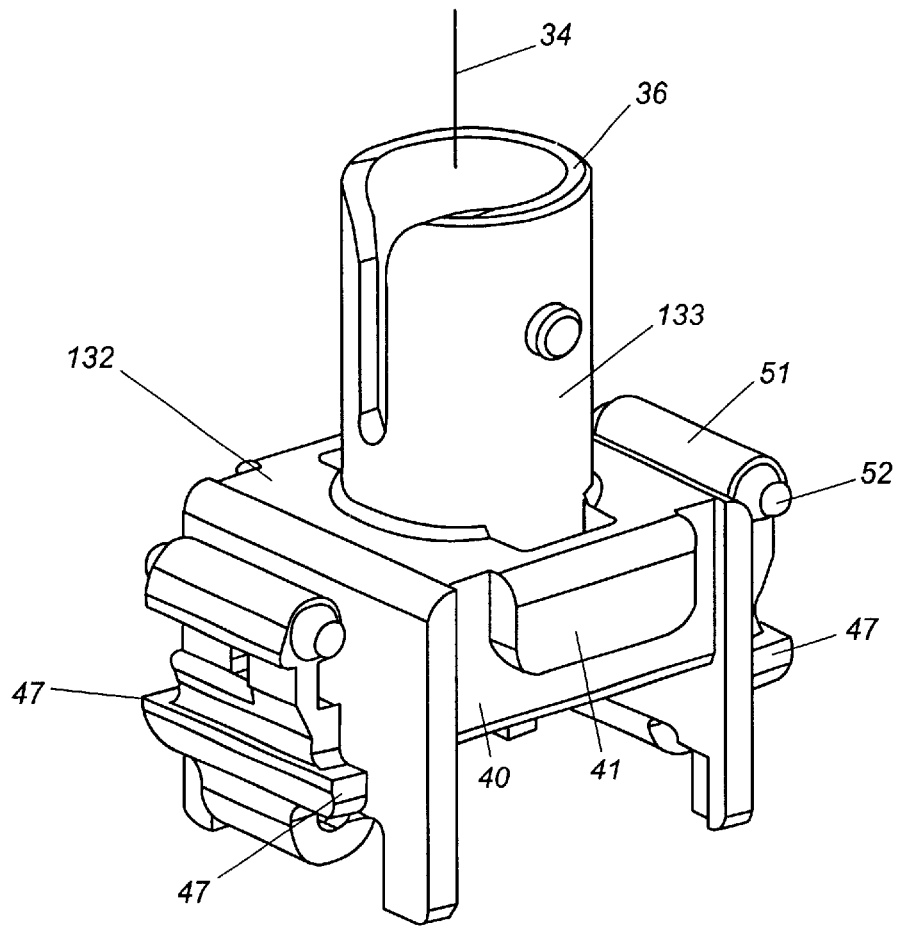
FIG. 10B is a front perspective view of the ST® buildout cap of FIG. 10A.
Figure 10A:
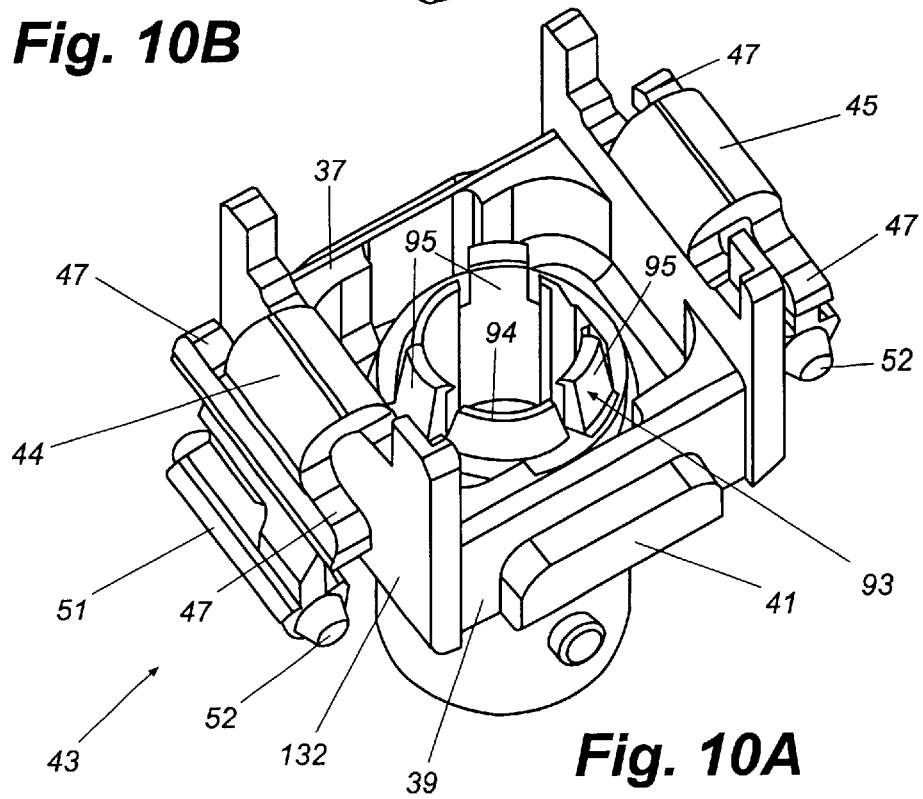
FIG. 10A is a bottom perspective view of a standard ST® buildout cap.

A standard ST® buildout cap 132 is illustrated in FIGS. 10A and 10B. As with the ST® buildout base 110, the buildout cap 132 is constructed in fashion essentially identical to buildout cap 32 for the SC type of optical fiber connector, with the exception that ST® buildout cap 132 includes an ST® shaped tubular body 133, does not have an SC cap latch, and has the sleeve holder latching mechanism 93 described above for use with the alignment sleeve holder 70. This is due to the fact that the ST® cap, as well as the FC and LC caps, does not include the SC cap latch as shown in FIG. 1 for use with the SC family of caps. So constructed, the ST® cap 132 includes a tubular body 133 sized and shaped for connection to an ST® optical fiber connector (not illustrated) formed about a longitudinal axis 34, and has a first end 36 and a spaced second end 37. A pair of opposed parallel sides 39 and 40 are formed, each one having an alignment key 41 for being received within a recess 19 of any one of the differing types of buildout bases with which the cap may be used. The cap latching arrangement 43 of the buildout base 132 is identical to that of the SC cap.

Figure 11:
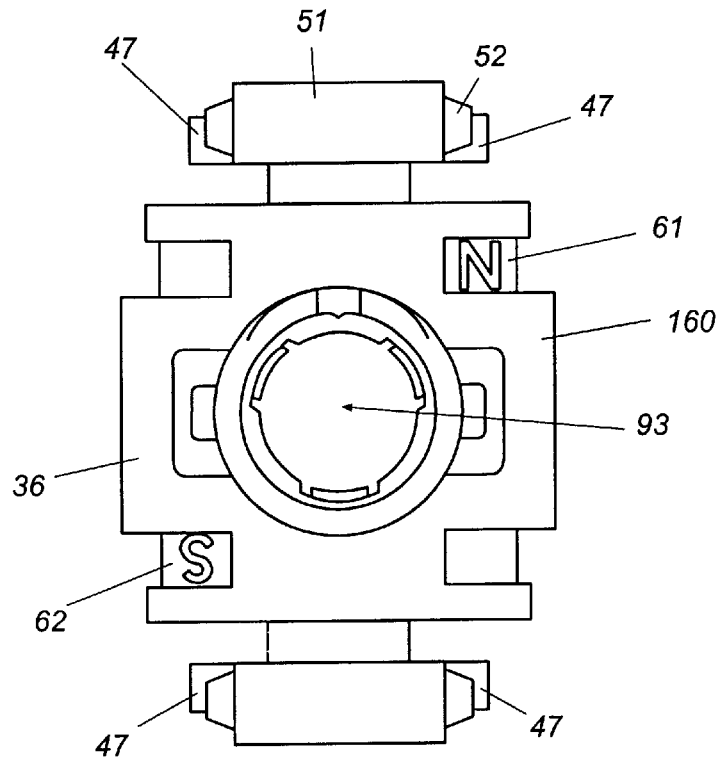
FIG. 11 is end elevational view of a second embodiment of an ST® buildout cap.
Figure 12:
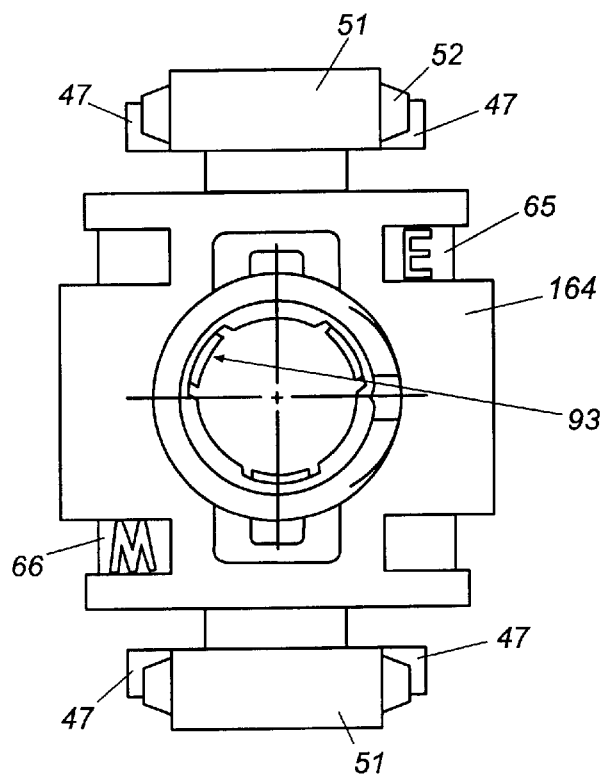
FIG. 12 is an end elevational view of a third embodiment of an ST® buildout cap.

Referring now to FIGS. 11 and 12, a North/South ST® buildout cap 160 is shown in FIG. 11, and an East/West ST® buildout cap 164 is shown in FIG. 12. In all respects, these caps are identical to ST® buildout cap 132 with the exception that buildout cap 160 contains the North/South orientation markings 61 and 62, respectively, and that the tubular body 33 and connector keyway 55 thereof are rotated 90° about the cap axis 34 for the buildout cap 164, which also has the East/West orientation markings 65, 66, respectively.

Figure 13:
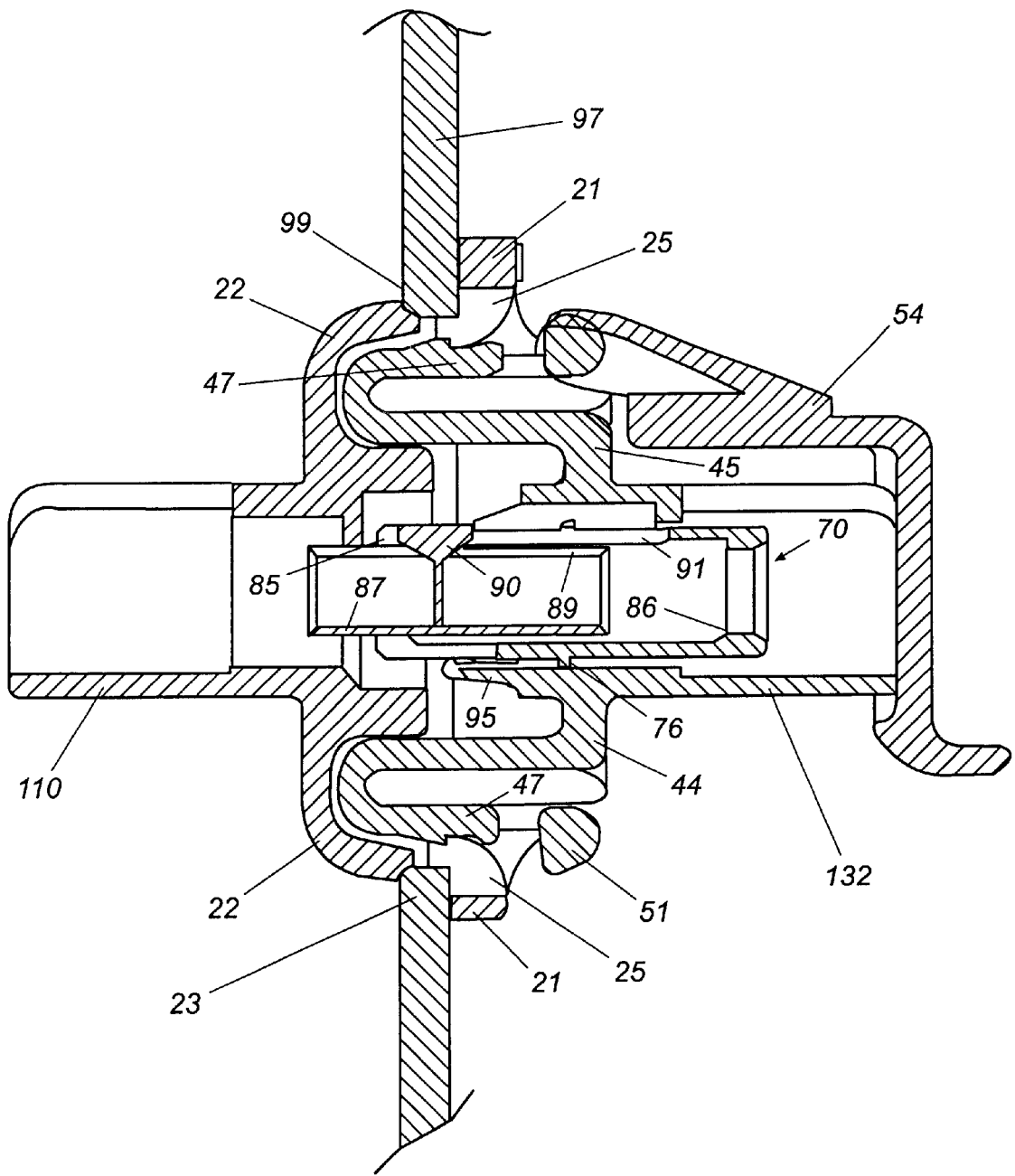
FIG. 13 is a side cross-sectional view of an assembled ST® buildout assembly received within a mounting panel in a snapfit.

A standard, or a North/North, ST® cap to an ST® base buildout assembly is shown in FIG. 13, the buildout base being snap-fit within the mounting panel 97 by being received within an opening 98 thereof, the notch 23 formed in each of the second flanges 22 of the ST® base 110 being received against the edge 99 of the panel opening 98 for receiving the ST® base 110 therein in a snap-fit. Thereafter, in the same fashion described for the SC buildout base and cap of FIG. 6 above, the ST® cap 132 is received in the ST® base 110 in a snap-fit, accomplished by the respective locking tabs 47 engaging the locking tabs 25 of the ST® base. The cap latching arrangement 93 is shown in FIG. 13, in which one of the resilient latching arms 95 is shown in position for receiving the annular mounting flange 97 of the sleeve holder, the sleeve holder not yet being fully positioned within the cap, the sleeve holder also illustrating in the manner in which the alignment sleeve 87 is passed through the first end thereof by urging the resilient legs 83 outwardly of the longitudinal axis of the sleeve holder until such time as the alignment sleeve is received within the sleeve holder in a snap-fit, captured between the first and second shoulders 85 and 86, respectively.

Figure 14B:
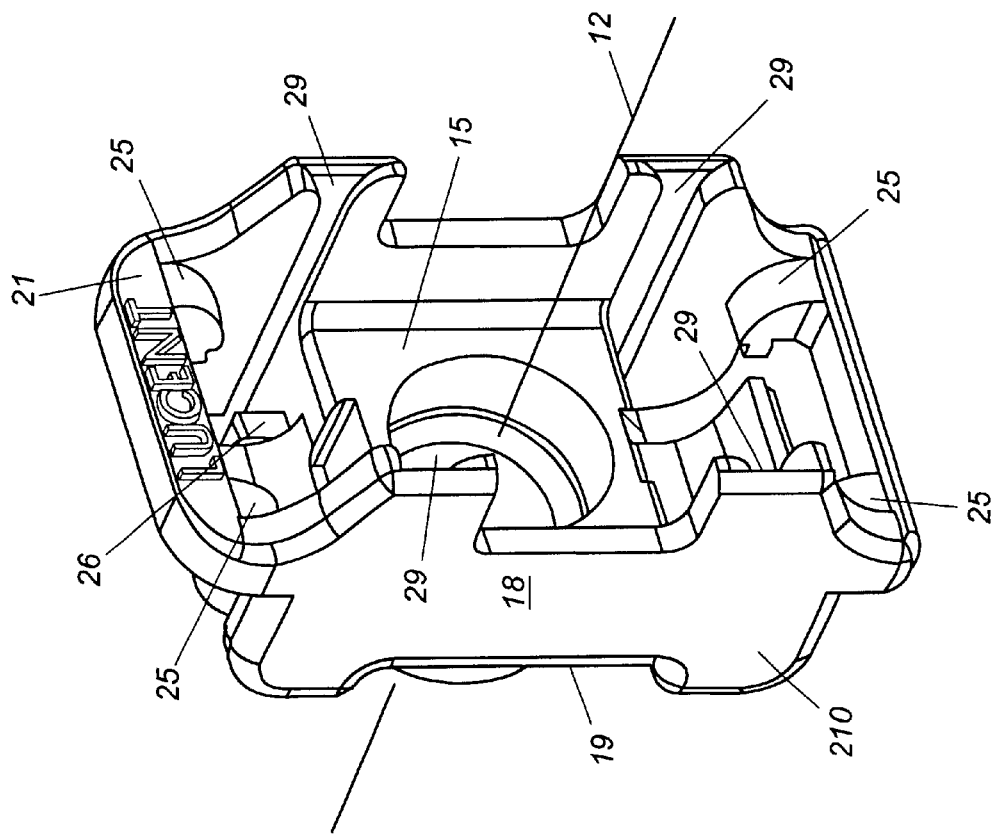
FIG. 14B is a front perspective view of the FC buildout base of FIG. 14A.
Figure 14A:
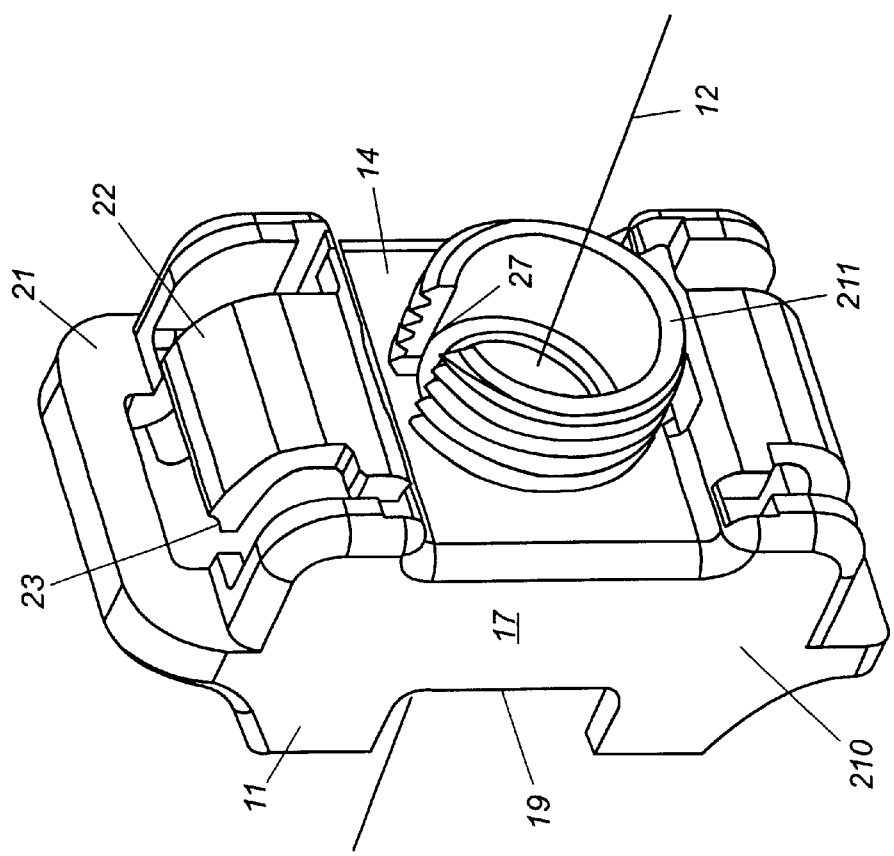
FIG. 14A is a rear perspective view of an FC buildout base.

An FC buildout base 210 is illustrated in FIGS. 14A and 14B. The FC buildout base is identical to the ST® base described above, with the exception that the tubular body portion 211 of the buildout base is sized and shaped for receiving an FC optical fiber connector (not illustrated) thereat.

Accordingly, the tubular body 211 is formed about a longitudinal axis 12, and has a first end 14, a spaced second end 15, and a pair of opposed and parallel sides 17 and 18, in each of which a recess or slot 19 is defined. The FC base also includes a pair of first mounting flanges 21, second mounting flanges 22, and corresponding notches 23 formed in each one of the second flanges 22. As shown in FIG. 14B, the FC base 210 includes four locking tabs 25, a position alignment key 26, and four spaced guide slots 29 for receiving the cap guides 56 of any one of the several differing types of buildout caps described herein and as illustrated in FIG. 1, therein.

Figure 15B:
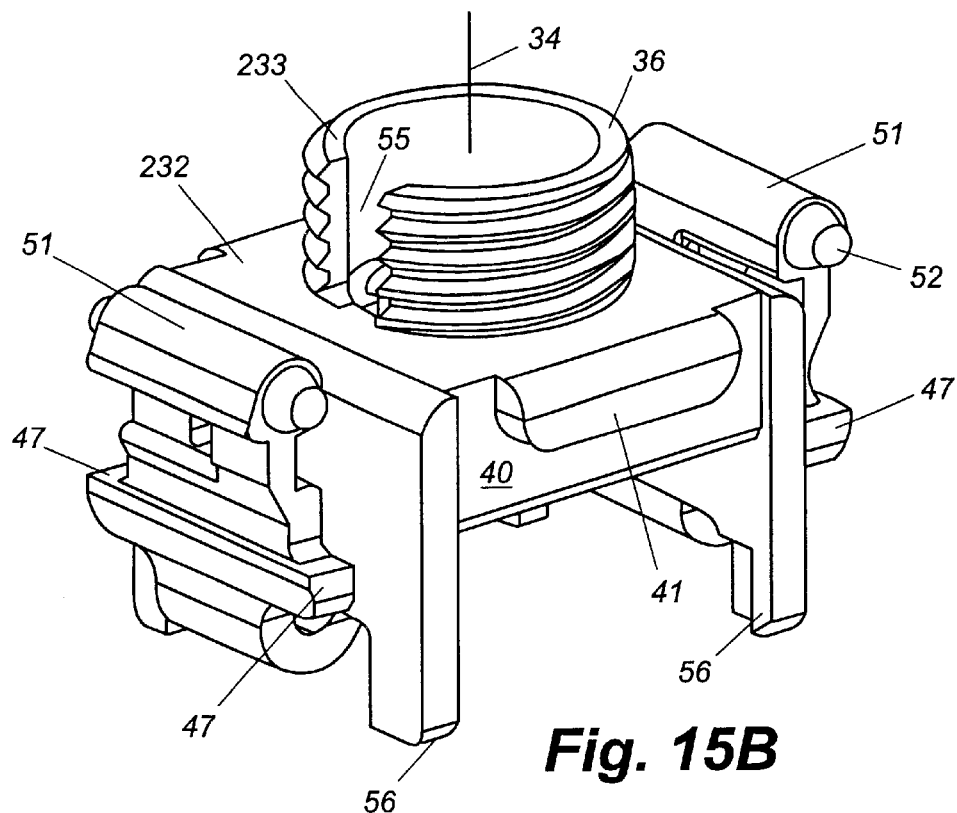
FIG. 15B is a front perspective view of the FC buildout cap of FIG. 15A.
Figure 15A:
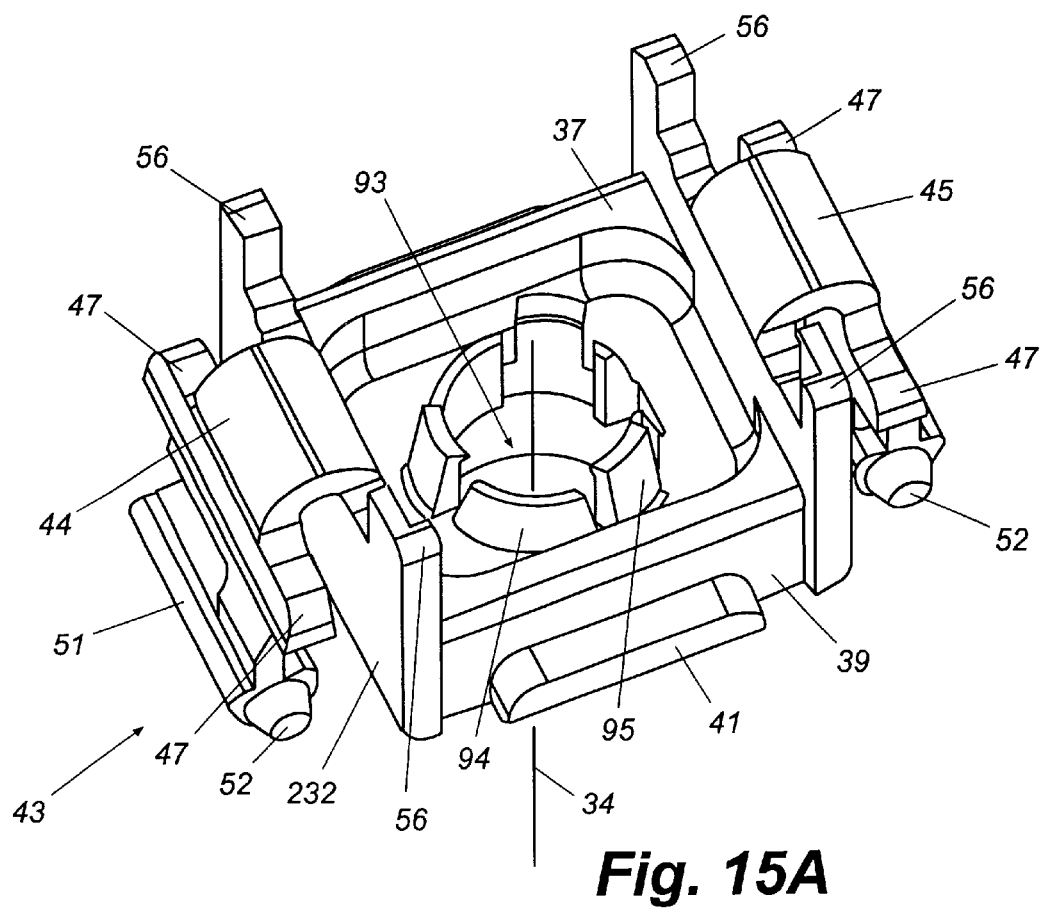
FIG. 15A is a bottom perspective view of a standard FC buildout cap.

A standard FC buildout cap 232 is illustrated in FIGS. 15A and 15B. The FC cap 232 is identical to the ST® cap 132 with the exception that its tubular body portion 233 is sized and shaped for connection to an FC optical fiber connector (not illustrated), but is otherwise formed about a longitudinal axis 34 having a first end 36 with a spaced second end 37, and a pair of opposed parallel sides 39 and 40 extending therebetween. Each of the sides 39, 40 has an alignment key 41 formed thereon for being received within the recess 19 of any one of the differing types of buildout bases described herein, and as illustrated in FIG. 1. The cap latching arrangement 43 of the FC base 232 is identical to that described above, as are the finger grips 51, the optical fiber connector keyway slot 55, and the four spaced cap guides 56, each of which is sized and shaped to be received within the guide slots 29 of any one of the differing types of buildout bases illustrated in FIG. 1. As with the ST® cap 232, the FC cap 332 includes a latching arrangement 93 for holding the alignment sleeve holder 70 therein, as illustrated in FIG. 18.

Figure 16:
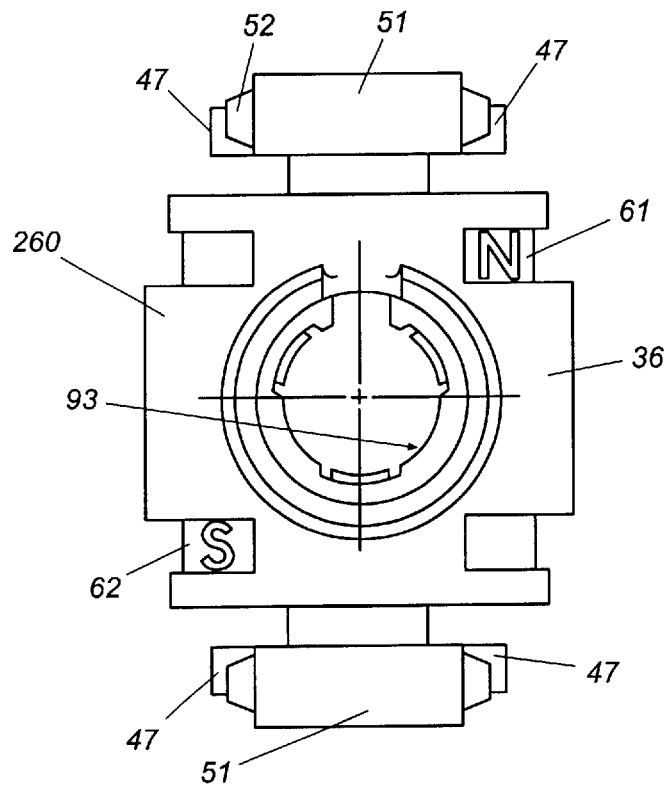
FIG. 16 is an end elevational view of a second embodiment of an FC buildout cap.
Figure 17:
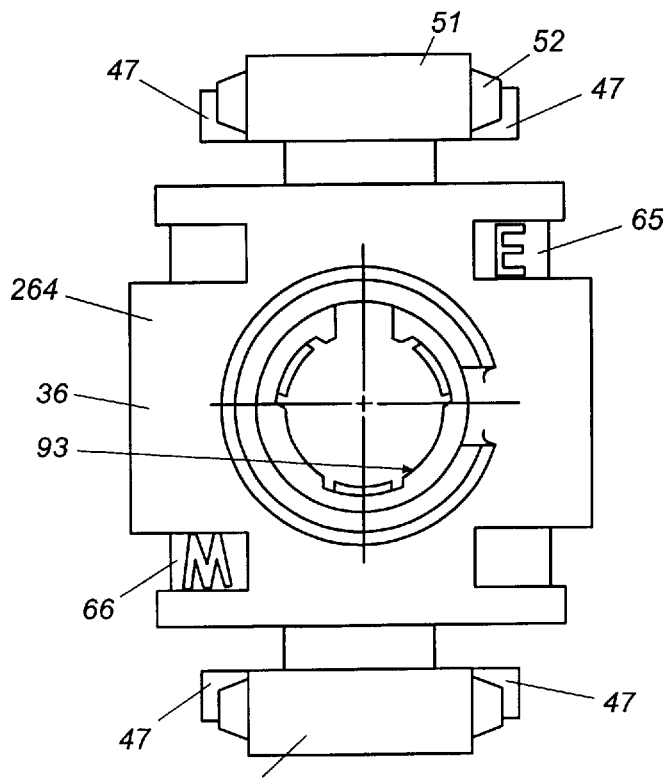
FIG. 17 is an end elevational view of a third embodiment of an FC buildout cap.

A North-South FC buildout cap 260 is illustrated in FIG. 16, and is otherwise identical to the FC buildout cap 232, with the exception of having the North rotational position orientation marking 61 thereon, and the diametrically opposed South rotational position orientation marking 62 thereon. The East/West FC cap 264 is illustrated in FIG. 17, and is identical to the standard FC cap 232 with the exception that the tubular body 233 and keyway 55 are rotated 90° about cap axis 34, and has the East rotational position orientation marking 65, and the diametrically opposed West rotational position orientation marking 66 thereon.

An FC high attenuation cap 268 is illustrated in FIG. 1, for the purposes of allowing the attenuator element 90 (FIG.18) to be positioned in the alignment sleeve to attain a high decibel level of attenuation, 17 decibels and greater, such that the ferrule springs (not illustrated) of the optical fiber connectors (not illustrated) received within the FC high attenuation cap 268 and any one of the differing types of buildout bases will not be compressed to a solid state, thus possibly damaging the terminated optical fiber ends. The FC high attenuation cap 268 differs from the standard FC cap 232 only by having a longer tubular body portion 233 when contrasted to the standard cap.

Figure 18:
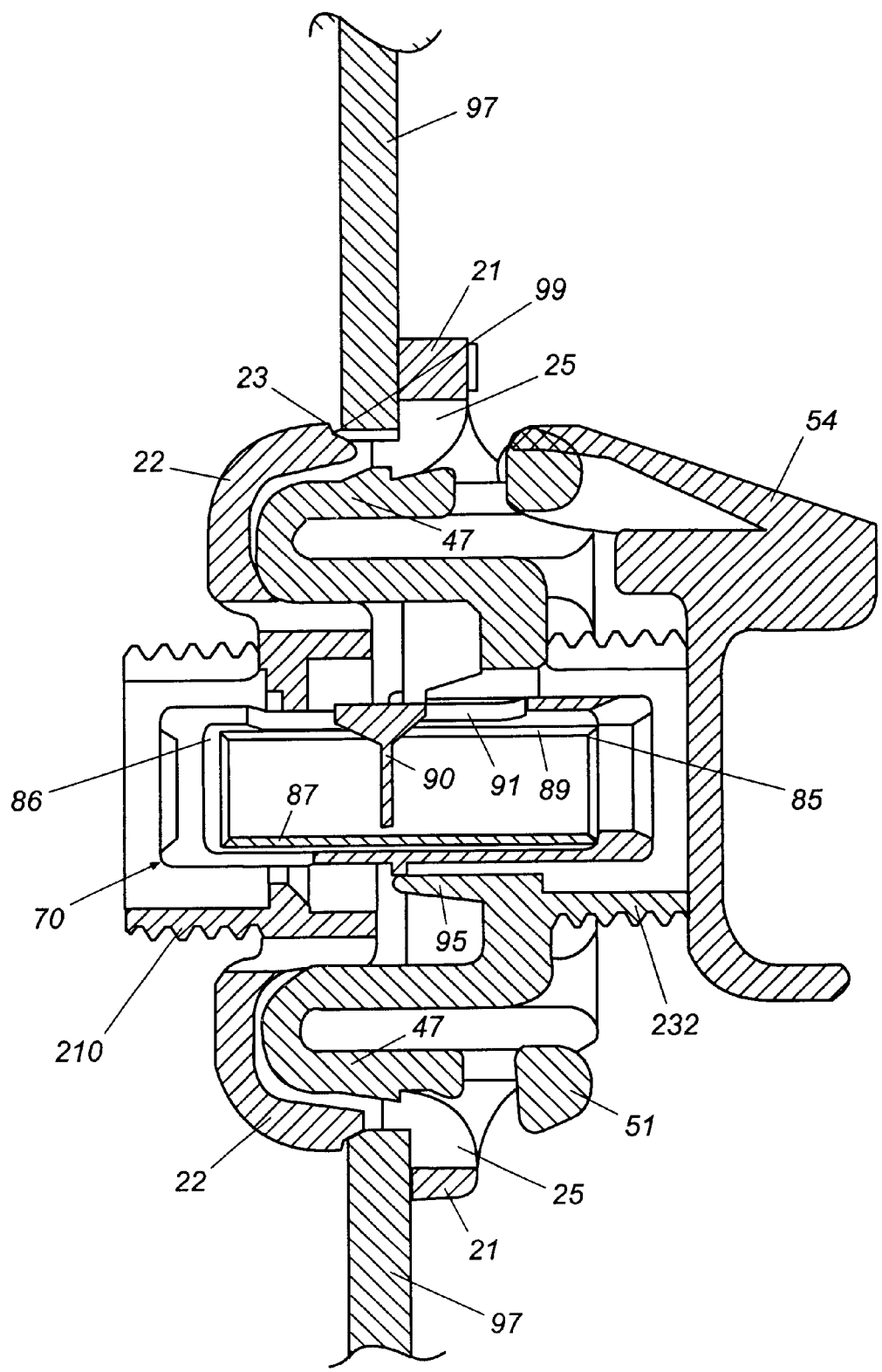
FIG. 18 is a side cross-sectional view of an assembled FC buildout assembly received within a mounting panel in a snap-fit.

FIG. 18 illustrates a standard FC buildout base and FC buildout cap assembly, the FC buildout base 210 being snap-fit within the opening 98 of the mounting panel 97 by having the notches 23 formed within the second mounting flanges 22 thereof received against an edge 99 of the opening 98. As shown in FIG. 18, the FC buildout cap 232 is received within the buildout base 210 in a snap-fit, the locking tabs 47 of the cap latching arrangement 43 of the cap being received against the locking tabs 25 of the buildout base in a snap-fit.

FIGS. 19A and 19B, respectively, illustrate a rear and a front perspective view of an LC buildout base 310. Once again, LC buildout base 310 is constructed in fashion identical to ST® base 110 and FC base 210, with the exception that the tubular body portion 311 of the LC buildout base is sized and shaped for being fastened to an LC type of optical fiber connector (not illustrated). So constructed, the LC base is formed about a longitudinal axis 12 having a first end 14 and a spaced second end 15, with a pair of spaced and parallel sides 17 and 18 extending therebetween, each one of the sides having a keyway recess or cut-out 19 defined therein for receiving the alignment key 41 of any one of the differing types of buildout caps therein.

The LC base 310 also includes a pair of first mounting flanges 21, a pair of spaced and opposed second mounting flanges 22, with a notch 23 defined in each second mounting flange for being received against the edge of the mounting panel opening in which the base is snap-fit. As shown in FIG. 19B, the LC base 310 includes four locking tabs 25, a position alignment key 26, and an optical fiber connector keyway 27 (FIG. 19A) defined within the tubular body portion for receiving and guiding the corresponding alignment key of an LC optical fiber connector therein. Lastly, as shown in FIG. 19B, the LC buildout base 310 includes four elongate guide slots 29, each of which is sized and shaped to receive a respective one of the cap guides 56 of any one of the differing types of buildout caps therein.

Figure 20A:
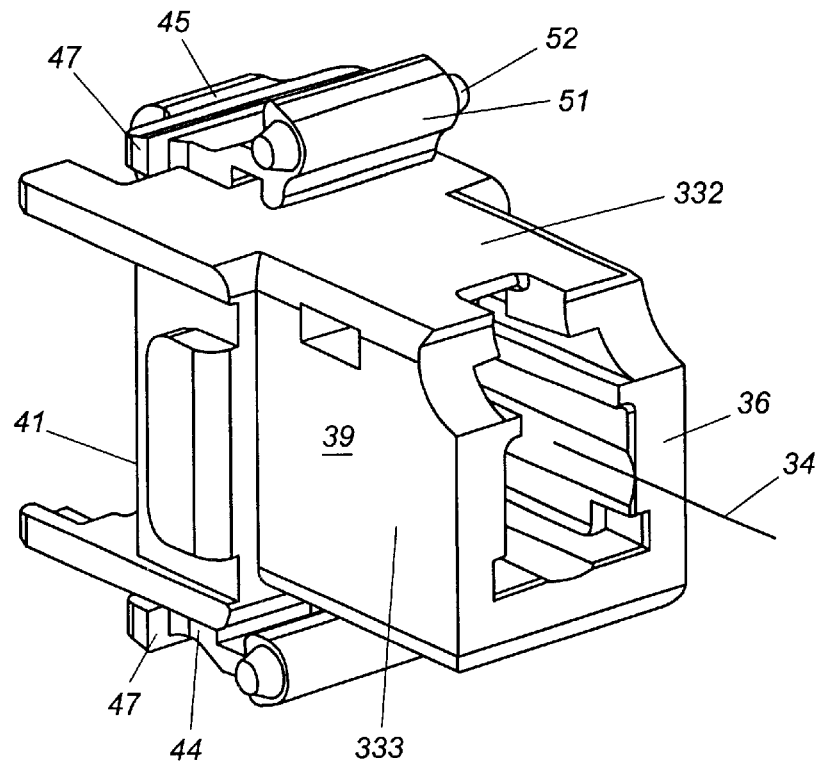
FIG. 20A is a rear perspective view of a standard LC buildout cap.
Figure 20B:
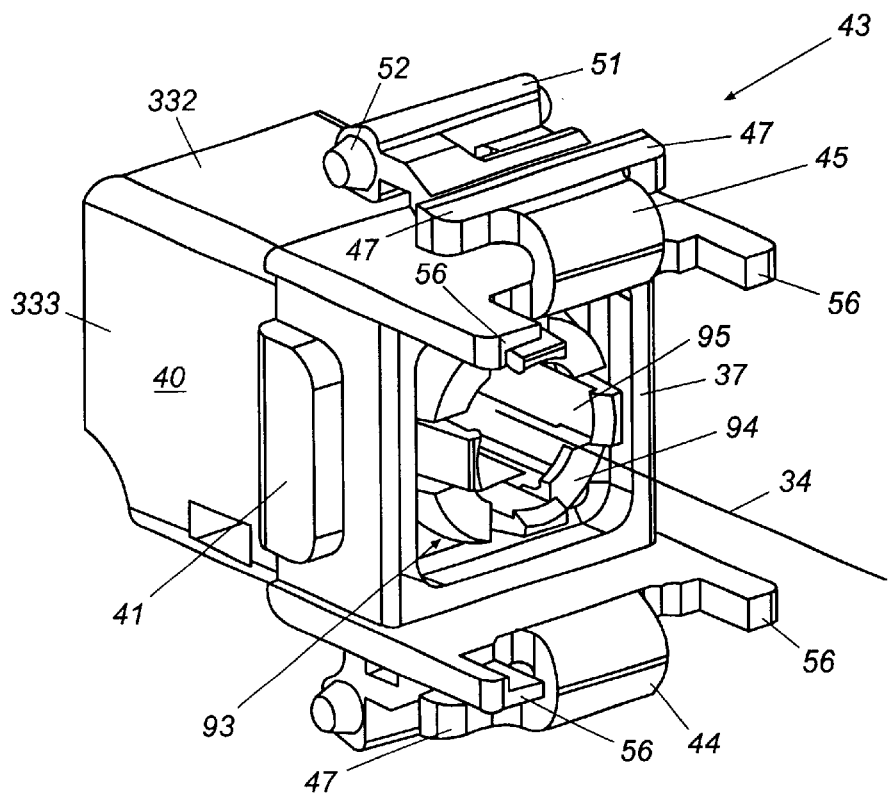
FIG. 20B is a front perspective view of the LC buildout cap of FIG. 20A.

A standard or North LC buildout cap 332 is illustrated in FIGS. 20A and 20B, respectively. As with the ST® cap 132 and the FC cap 232, the LC cap 332 is constructed in fashion identical to the others with the exception that its tubular body portion 333 is sized and shaped for coupling to an LC type of optical fiber connector (not illustrated), and like both of the ST® and FC caps, the LC cap contains the sleeve holder latching mechanism 93.

So constructed, therefore, the LC cap has a tubular body 333 formed about a longitudinal axis 34 having a first end 36 and a spaced second end 37, with a pair of spaced, parallel and opposed first and second sides 39, 40. An alignment key 41 is formed on each one of the sides 39, 40, respectively, for being received within the respective recesses or slots 19 of any one of the differing types of buildout bases described hereinabove. The LC cap includes the identical cap latch mechanism 43 found on the SC, ST® and FC caps described above, comprised of a first resilient flange 44, a second resilient flange 45, and with a pair of locking tabs 47 defined on each one of the first and second flanges, respectively. The finger grip 51 is formed at the end of each flange, with a pair of spaced dust cover pivots formed at the end of each finger grip for receiving the dust cover 54 (FIG. 25) thereon in known fashion. The LC cap also includes the four cap guides 56, each of which is sized and shaped to be received within a respective one of the guide slots 29 of any one of the differing types of buildout bases illustrated in FIG. 1.

Figure 21:
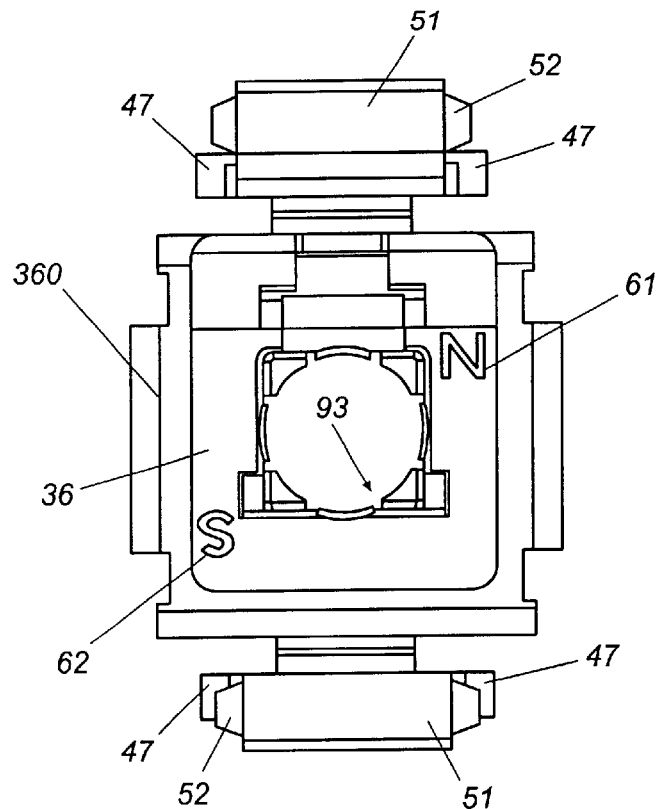
FIG. 21 is an end elevational view of a second embodiment of an LC buildout cap.
Figure 22:
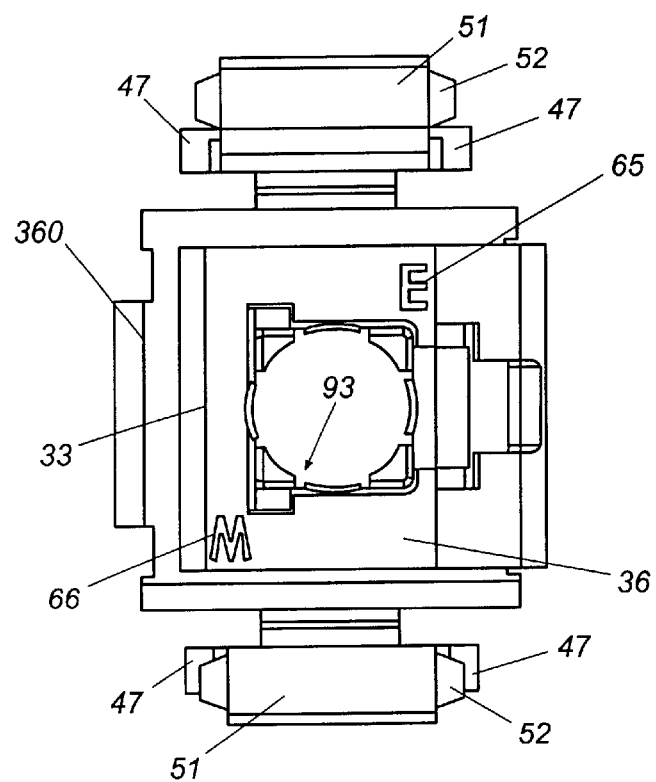
FIG. 22 is an end elevational view of a third embodiment of an LC buildout cap.

A North/South LC cap 360 is illustrated in FIG. 21, which cap is identical to LC cap 332 as illustrated in FIGS. 19A and B, with the difference that the cap 360 includes a first or North rotational position orientation marking 61 and a second or South rotational position orientation marking 62 thereon, for use in tuning the optical fiber connection; as described above. In like fashion, and as illustrated in FIG. 22, the East/West LC cap 364 is identical to the standard LC cap 332, with the exception of the body portion 333 thereof and the connector keyway 55 being rotated 90°, and having a first or East rotational position orientation marking 65, and a diametrically opposed second or West rotational position orientation marking 66 formed thereon. Also, as for the SC series of buildout caps and FC series of buildout caps, the LC series of buildout caps includes a high attenuation SC cap 368 as illustrated in FIG. 1, the only difference being that the tubular body portion 333 of the high attenuation cap is lengthened for allowing a high decibel, i.e. thicker, attenuator element to be placed therein, as illustrated generally in FIG. 25.

Referring now to FIGS. 23A–25, where the standard LC base and cap buildout assembly differs from the SC, ST®, and FC buildout assemblies is that, and as known, an LC buildout base and buildout cap are each intended for use with an LC type of optical fiber connector having a 1.25 mm diameter ferrule as opposed to the larger 2.5 mm diameter ferrules of the SC, ST® and FC types of optical fiber connectors. Accordingly, the alignment sleeve holder 70 used with the SC, ST® and FC caps will not be used here, rather a second embodiment 370 of the alignment sleeve holder will be used, which embodiment is sized and shaped for receiving an LC alignment sleeve 387 therein.

Figure 24:
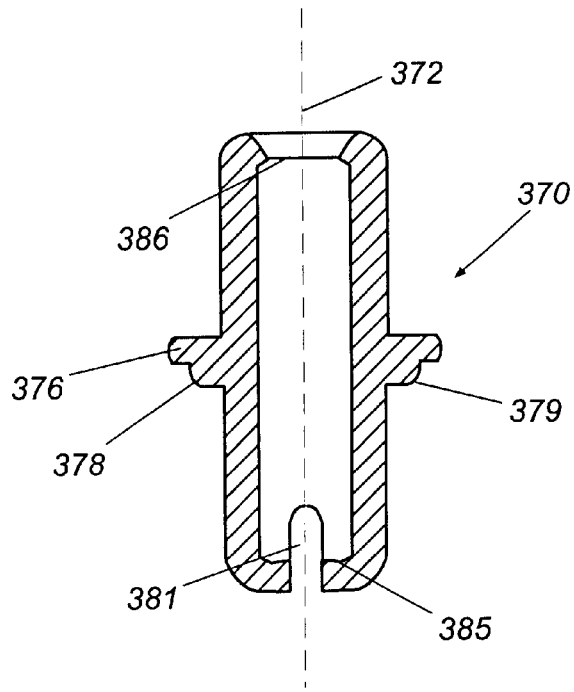
FIG. 24 is a side cross-sectional view along the longitudinal axis of the alignment sleeve holder of FIG. 23A.
Figure 23A:
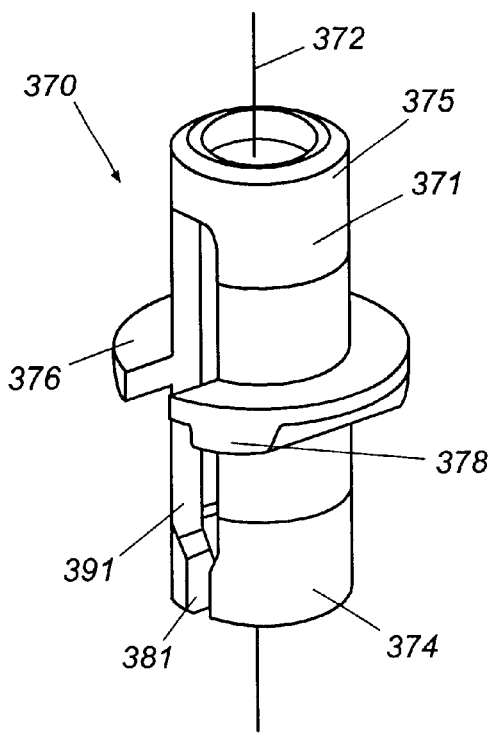
FIG. 23A is a first perspective view of a second embodiment of an alignment sleeve holder for use with an LC buildout cap.
Figure 23B:
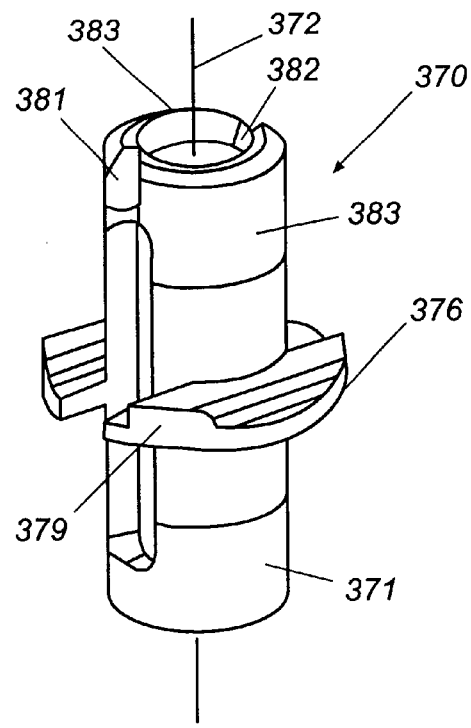
FIG. 23B is a second perspective view of the alignment sleeve holder of FIG. 23A.

Referring now to FIGS. 23A–24, the second alignment sleeve holder 370 has an elongate tubular body 371 formed about a longitudinal axis 372. The body has first end 374 and a spaced second end 375, with an annular mounting flange 376 formed along the exterior surface of the body between its first and second ends and extending outwardly thereof. A first snap-fit tab 378 and a radially spaced second snap-fit tab 379 are formed on the annular mounting flange 376, each of which are sized and shaped to be received within the sleeve holder latching mechanism 93 of the LC cap as illustrated in FIG. 20B.

As with the first alignment sleeve holder 70, the second alignment sleeve holder 370 has a first slot 381 and a radially spaced second slot 382 defined within the first end of the tubular body, each of the slots extending partially toward the second end of the body. These two slots form a pair of resilient legs 383 which are sized and shaped for being urged outwardly of the longitudinal axis 372 of the sleeve holder as the alignment sleeve 387 is passed therebetween for being captured within the tubular body between first annular shoulder 385 and a spaced second annular shoulder 386, each of which is defined within the tubular body at its first and second ends, respectively, about the longitudinal axis 372. The two shoulders 385, 386 are spaced apart a distance sufficient to capture the LC alignment sleeve 387 therebetween in a snap-fit.

Figure 25:
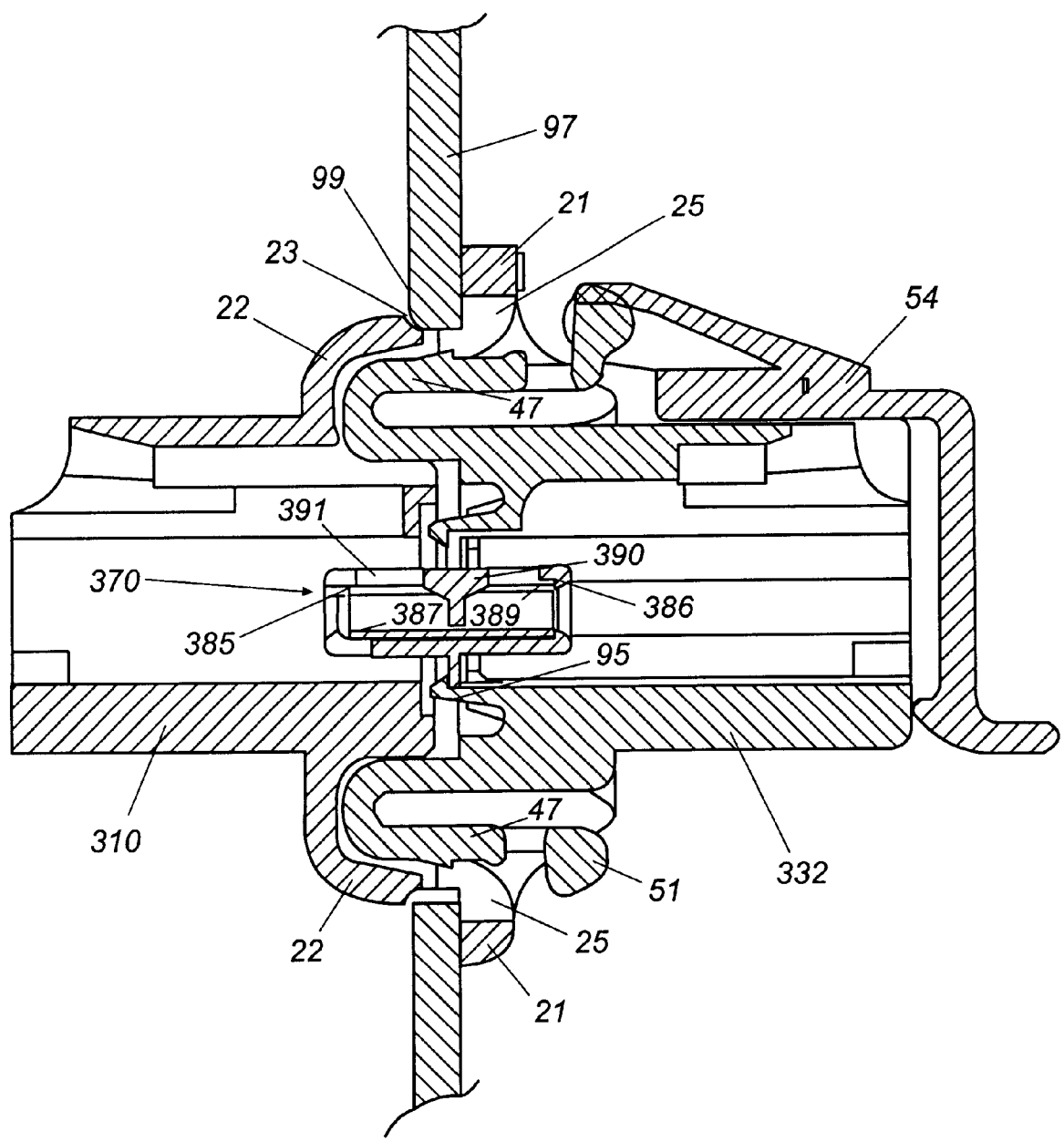
FIG. 25 is a side cross-sectional view of an assembled LC buildout assembly received within a mounting panel in a snap-fit.
Figure 26:
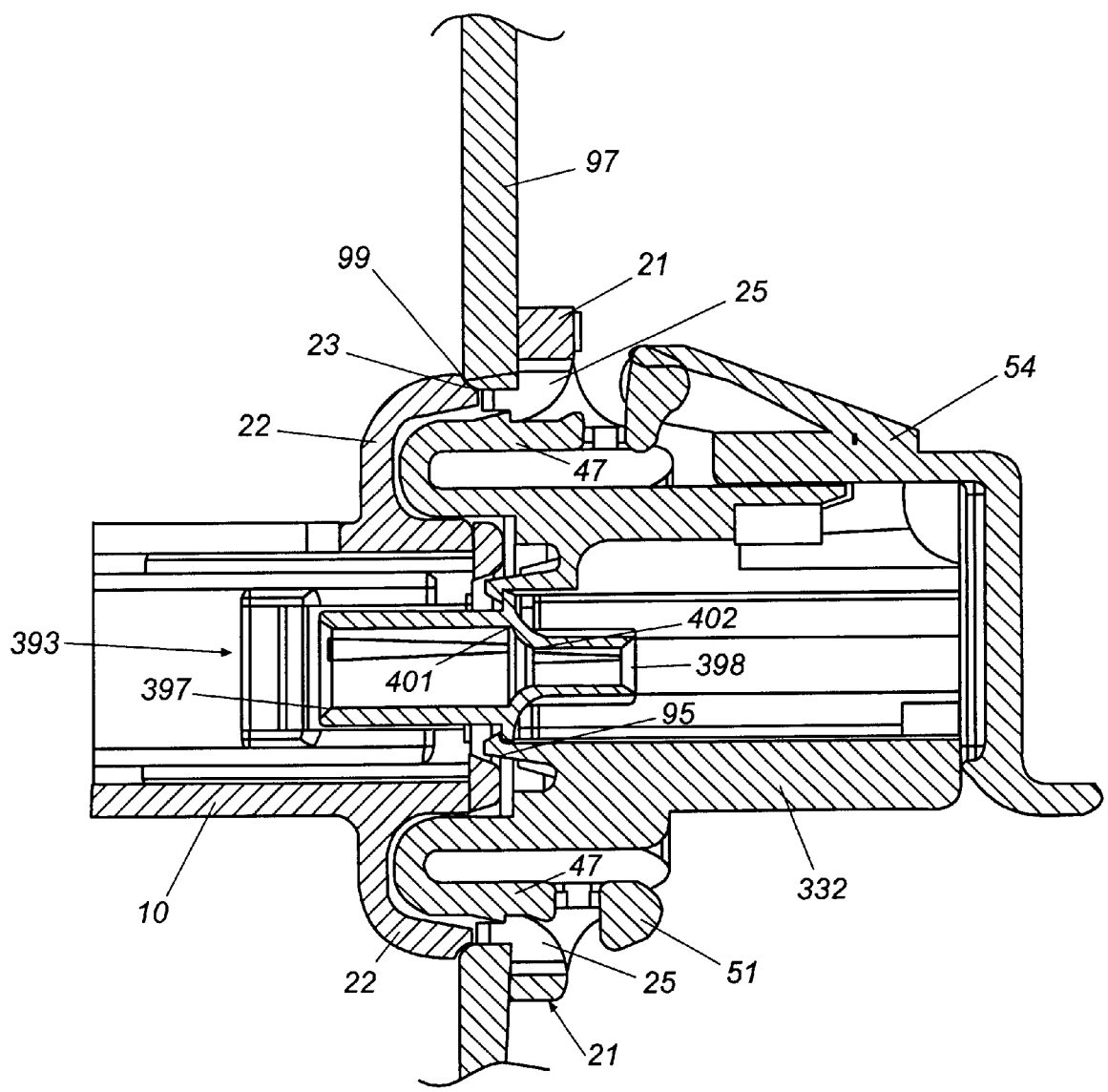
FIG. 26 is a side cross-sectional view of a hybrid LC-SC buildout assembled received within a mounting panel in a snap-fit.

As best shown in FIG. 25, and in known fashion, the alignment sleeve 387 will include an elongate attenuator slot 389 defined therein, which will typically extend the length of the alignment sleeve. An attenuator element 390 may be received within the slot 389, which thus necessitates that a third elongate slot 391 be defined within the tubular body. The third slot 391 extends, in this instance, from the first slot 381 substantially toward the second end of the tubular body. It is understood by those skilled in the art, however, that this third slot can extend from either one of the first or second slots, as desired. As for the alignment sleeve holder 70, alignment sleeve holder 370 is constructed of a resilient material, preferably polysulfone or polyetherimide.

Referring now to FIG. 25, a standard or straight LC base to LC cap buildout assembly is illustrated, the LC base 310 being received within the mounting panel 97 in a snap-fit in the same fashion as is accomplished for the other types of buildout bases, namely by sandwiching the mounting panel between the first flanges 21 and the second flanges 22, with the notch 23 of the respective second flanges being received against the edge 99 of the opening 98 defined within the mounting panel 97. The LC cap 332 is snap-fit to the LC base 310 by passing the cap along the longitudinal axis of the base such that the second end of the cap is received within the second end of the base, until such time as the locking tabs 47 of the cap are passed over the locking tabs 25 of the base, the cap then being removably received within the base in a snap-fit, as is the case for the other buildout assemblies illustrated in FIGS. 6, 13, and 18.

As illustrated in FIGS. 1, 26, 29, and 30, another one of the new features of the buildout system 5 illustrated in FIG. 1, is that, for the first time in an optical fiber connector buildout system, it is possible to take any one of the SC, ST®, or FC bases and fasten these to an LC cap, or to take any one of the SC, ST® or FC caps and fasten these to an LC base. This is illustrated in greater detail in FIGS. 26, 29, and 30. Although these figures illustrate an LC base receiving an SC cap, an ST® cap, and an FC cap, respectively, it is understood that this could just as well illustrate an LC cap being received within any one of the SC, ST® or FC bases.

Figure 27:
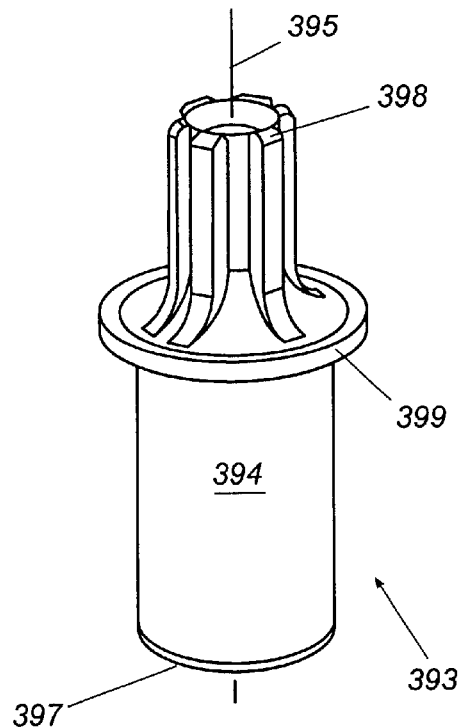
FIG. 27 is a perspective view of a stepped alignment sleeve used with the buildout system.
Figure 28:
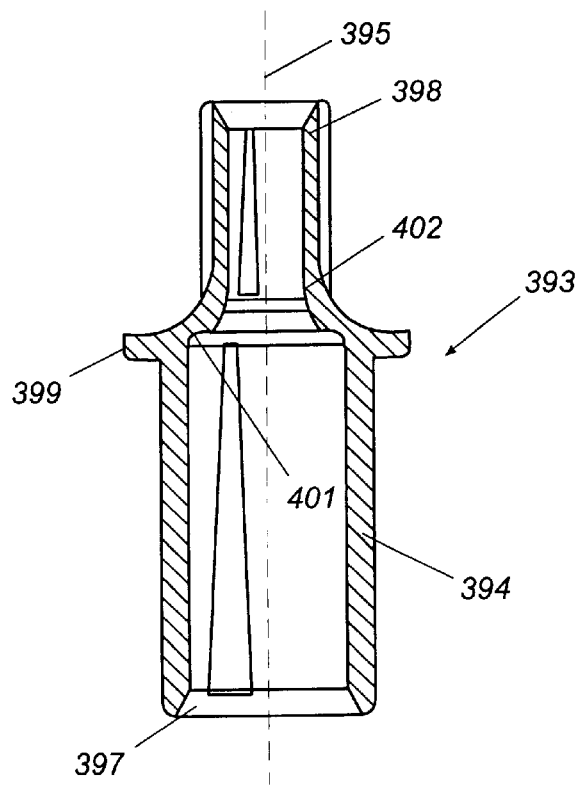
FIG. 28 is a side cross-sectional view along the longitudinal axis of the stepped alignment sleeve of FIG. 27.

This is made possible through the use of a stepped alignment sleeve 393, of the type which is disclosed in U.S. patent application Ser. No. 09/211,117 to Shahid, et al., entitled "Alignment Sleeves for Interconnecting Optical Ferrules of Dissimilar Size, and Methods for Making Same", filed in the United States Patent and Trademark Office on Dec. 14, 1998, the provisions of which are incorporated herein fully by this reference. The stepped alignment sleeve holder 393, illustrated in FIGS. 27 and 28, allows for the coupling of a 2.5 mm diameter ferrule to a 1.25 mm ferrule. The stepped alignment sleeve is constructed to align the two ferrules along its longitudinal axis 395 (FIGS. 27, 28). Moreover, and as described above, this combination is also made possible due to the universal construction of the respective bases and caps of this system, in which the bases and caps are all essentially identically shaped and sized with the primary difference being the configuration of the respective tubular bodies for receiving a particular type of optical fiber connector, as described.

Referring now to FIGS. 27 and 28, the stepped alignment sleeve 393 is illustrated in greater detail. The stepped alignment sleeve has an elongate tubular body 394 formed about a longitudinal axis 395. The tubular body has a first end 397 and a spaced second end 398. As shown in FIGS. 27 and 28, the first end of the body is sized and shaped to receive a 2.5 mm diameter. ferrule therein, typical of an SC, an ST®, and/or an FC optical fiber connector. The second end of the stepped alignment sleeve is sized and shaped to received a 1.25 mm diameter ferrule therein, typical of an LC optical fiber connector.

Still referring to FIGS. 27 and 28, a continuous annular mounting flange 399 is formed on the exterior surface of the tubular body intermediate its first and second ends and extends outwardly thereof, the annular mounting flange 399 being sized and shaped to correspond to the outside diameter of the mounting flange 76 of the alignment sleeve holder 70 and the mounting flange 376 of the sleeve holder 370, all three flanges having a common outside diameter such that the stepped alignment sleeve holder and the two alignment sleeve holders 70, 370 can be interchangeably used within any one of the differing types of buildout caps of the buildout system 5. As shown in FIG. 28, a first annular shoulder 401 is formed inside the tubular body, and a second annular shoulder 402 is also formed inside the tubular body about the longitudinal axis, and spaced from the first annular shoulder.

Figure 29:
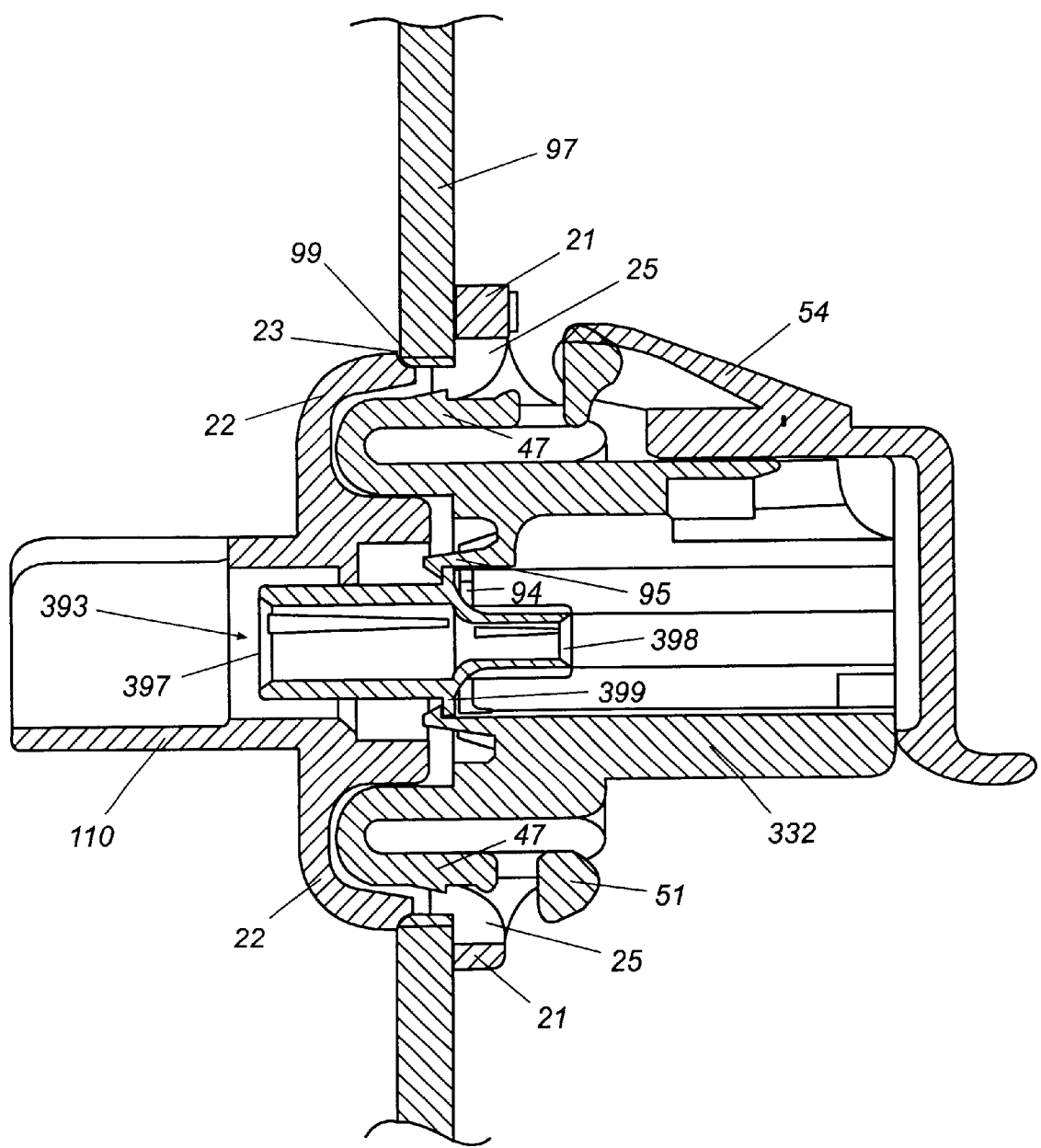
FIG. 29 is a side cross-sectional view of an LC-ST® hybrid buildout assembly received within a mounting panel in a snap-fit.
Figure 30:
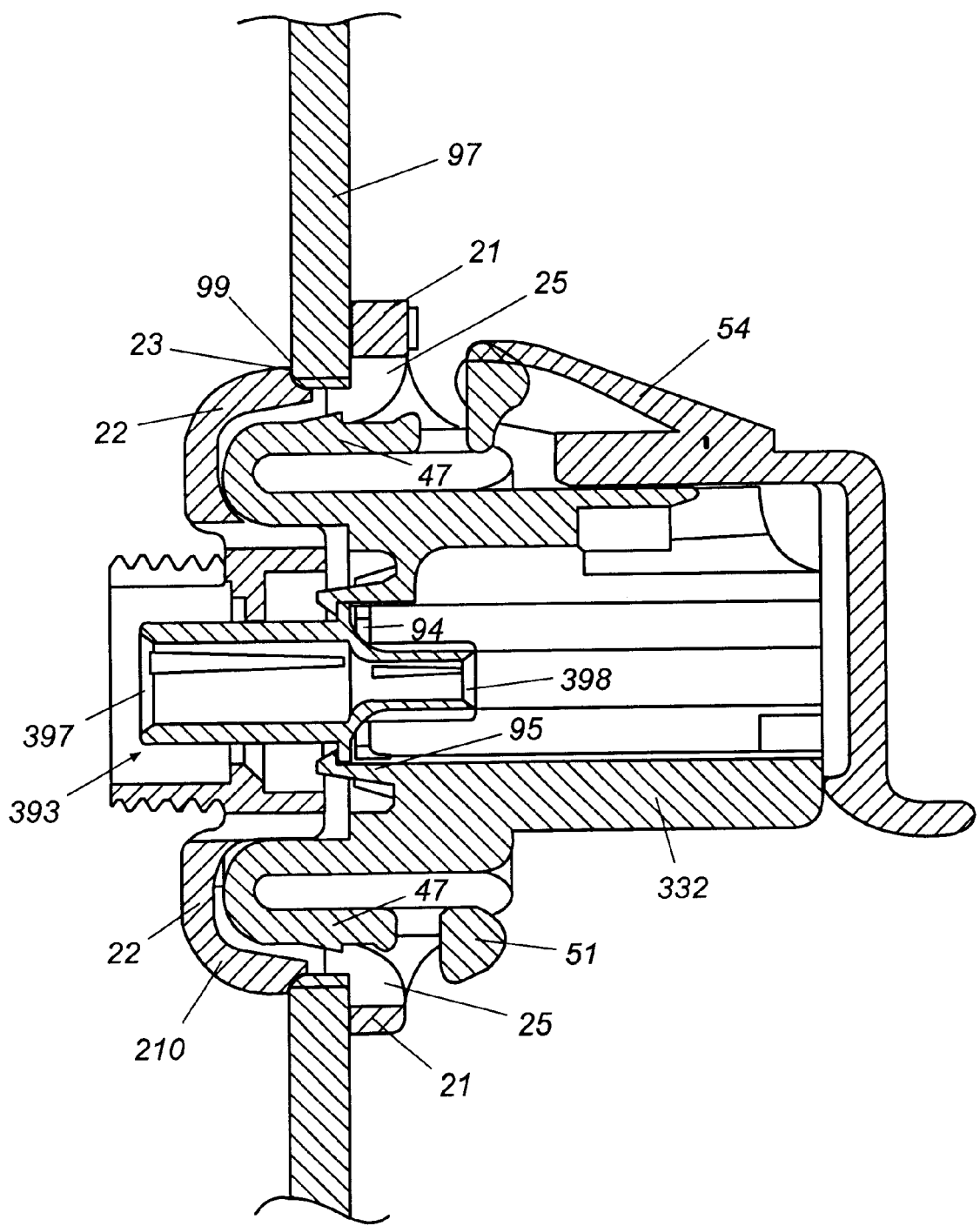
FIG. 30 is a side cross-sectioned view of an LC-FC hybrid buildout assembly received within a mounting panel in a snap-fit.

FIG. 29 illustrates an LC cap 332 coupled to an ST® base 110, with the stepped alignment sleeve holder 393 received within the sleeve holder latching mechanism 93 of the cap 332. As disclosed in the aforementioned U.S. Patent Application, the stepped alignment sleeve holder is not constructed and arranged to be used with an attenuator element. However, in fashion heretofore unknown in the art, the stepped alignment sleeve holder can be used with the tunable feature of the buildout system 5 such that the cap of the optical fiber buildout assembly can be received in one of a plurality, in this instance four, rotational positions about the longitudinal axis 12 of the buildout base, no matter what type of buildout base is being used. Similarly, then, FIG. 30, illustrates an LC cap 332 coupled to an FC base 210, once again using the stepped alignment sleeve holder 393, the stepped alignment sleeve holder being held within the cap 332 by the sleeve holder latching mechanism 93.

It must be noted that the stepped alignment sleeve holder will only be used in those instances in which an LC optical fiber connector or buildout base/cap, respectively, is being coupled to one of the larger diameter optical fiber connectors, namely the SC, ST®, and/or FC connectors, and their respective buildout bases or caps. The stepped alignment sleeve holder will lo not be used in a "straight" buildout assembly, i.e., one in which an optical fiber connector having a 2.5 mm diameter ferrule is connected to a another 2.5 mm diameter ferrule optical connector, or the two optical fiber connectors have a 1.25 mm diameter ferrule.

Each of the several embodiments of the buildout bases and caps of this invention are preferably comprised of a resilient material, for example plastic, to include polysulfone and polyetherimide. The alignment sleeves 87, 387, may be formed of the same aforementioned plastics, or may also be formed of a ceramic/zirconia material or a phosphor bronze material, as known. The stepped alignment sleeve holder 393 is also preferably made of a plastic material, preferably of polyetherimide with no colorant, as described in the aforementioned U.S. patent application.

Although several preferred embodiments of the invention have been disclosed in the foregoing specification, it is understood by those skilled in the art that many modifications and other embodiments of the invention will come to mind to which the invention pertains, having the benefit of the teaching presented in the foregoing description and the associated drawings. It is thus understood that the invention is not limited to the specific embodiments disclosed herein, and that many modifications and other embodiments of the invention are intended to be included within the scope of the appended claims. Moreover, although specific terms are employed herein, as well as in the claims, they are used in a generic and descriptive sense only, and not for the purposes of limiting the described invention, nor the claims which follow.

We claim:

1. An optical fiber buildout system, said buildout system comprising:

a buildout base formed about a first longitudinal axis and having a first end and a spaced second end;

a buildout cap having a first end and a spaced second end;

said base being constructed and arranged to receive said cap therein;

an elongate tubular sleeve holder having a first end and a spaced second end, said sleeve holder having an annular mounting flange formed intermediate the ends of the sleeve holder and projecting outwardly thereof; and a latching mechanism formed as a part of said cap, said latching mechanism being constructed and arranged to receive the mounting flange of the sleeve holder therein in a snap-fit.

2. The system of claim 1, wherein said sleeve holder lies along said first axis as said cap is received within said base.

3. The buildout system of claim 1, said sleeve holder comprising:

an elongate tubular body formed about a second longitudinal axis, said body having a first end and a spaced second end;

at least a first slot defined in the first end of said body;

the first end of said body being constructed and arranged to be resiliently urged outwardly of said second axis along said at least a first slot for allowing an elongate alignment sleeve to be passed into said body along said second axis; and a first annular shoulder defined within the first end of said body about said second axis, and a second annular shoulder spaced from said first annular shoulder and defined within the second end of said body about said second axis;

said first and second shoulders being spaced apart from one another a distance sufficient to capture said alignment sleeve therebetween.

4. The buildout system of claim 3, said alignment sleeve further comprising an elongate attenuator slot defined within and extending in the lengthwise direction of said alignment sleeve.

5. The buildout system of claim 3, further comprising an attenuator element positioned within said attenuator slot.

6. The buildout system sleeve of claim 3, said tubular body further comprising a second slot defined in the first end thereof, said second slot being spaced radially from said first slot about said second axis, and also including an elongate third slot defined within said body, said third slot extending longitudinally toward the second end of the body from one of said first and said second slots, respectively, defined in the first end of said body, and being sized and shaped to outwardly expose at least a portion of the length of said attenuator slot therethrough.

7. The buildout system of claim 1, wherein said buildout base is selected from one of the group of buildout bases consisting of an SC base, an ST® base, and an FC base, and wherein said buildout cap is selected from one of the group of buildout caps consisting of an SC cap, an ST® cap, and an FC cap.

8. The buildout system of claim 1, wherein said buildout base comprises an LC base, and wherein said buildout cap comprises an LC cap.

9. The buildout system of claim 1, the second end of said base being constructed and arranged to receive said cap in one of a plurality of rotational positions about said first axis.

10. The buildout system of claim 1, the mounting flange of said sleeve holder having at least one raised snap-fit tab formed as a part thereof and adapted to be received with the cap of the buildout in said snap-fit.

11. The buildout system of claim 10, the mounting flange of said sleeve holder having at least two radially spaced and raised snap-fit tabs formed as a part thereof and adapted to be received with the cap of the buildout in said snap-fit.

12. The burnout system of claim 1, said latching mechanism comprising a base portion for receiving the mounting flange of the sleeve holder thereon, and at least one elongate resilient latching arm positioned with respect to said base portion, said at least one latching arm being constructed and arranged to be urged away from said base portion as the mounting flange is passed thereover and onto said base portion, and to be normally biased into a latching position with respect to said base portion.

* * * * *

UNITED STATES PATENT AND TRADEMARK OFFICE
CERTIFICATE OF CORRECTION

PATENT NO.    : 6,447,172 B1
DATED         : September 10, 2002
INVENTOR(S)   : Stephenson et al.

It is certified that error appears in the above-identified patent and that said Letters Patent is hereby corrected as shown below:

Column 18,
Line 47, "claim 3" should read -- claim 4 --;
Line 49, "claim 3" should read -- claim 4 --.

Column 20,
Line 1, "burnout" should read -- buildout --.

Signed and Sealed this

Twenty-fourth Day of December, 2002

JAMES E. ROGAN
*Director of the United States Patent and Trademark Office*